(12) United States Patent
Foley et al.

(10) Patent No.: US 11,635,376 B2
(45) Date of Patent: *Apr. 25, 2023

(54) FIBER-OPTIC BASED MATERIAL PROPERTY MEASUREMENT SYSTEM AND RELATED METHODS

(71) Applicant: University of Virginia Patent Foundation, Charlottesville, VA (US)

(72) Inventors: Brian M. Foley, Atlanta, GA (US); John T. Gaskins, Charlottesville, VA (US); Patrick E. Hopkins, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/153,481

(22) Filed: Jan. 20, 2021

(65) Prior Publication Data

US 2021/0140883 A1 May 13, 2021

Related U.S. Application Data

(63) Continuation of application No. 16/311,413, filed as application No. PCT/US2017/032390 on May 12, 2017, now Pat. No. 10,928,317.

(Continued)

(51) Int. Cl.
*G01N 21/55* (2014.01)
*G01N 21/17* (2006.01)
*G01B 11/06* (2006.01)

(52) U.S. Cl.
CPC ......... *G01N 21/55* (2013.01); *G01B 11/0633* (2013.01); *G01N 21/17* (2013.01);
(Continued)

(58) Field of Classification Search
CPC .... G01N 21/55; G01N 21/17; G01N 21/1717; G01N 2021/1731; G01N 2201/06113; G01B 11/0633
(Continued)

(56) References Cited

U.S. PATENT DOCUMENTS 4,750,822 A * 6/1988 Rosencwaig .......... G01N 21/17
356/432
4,795,260 A * 1/1989 Schuur ................... G01N 21/17
356/400

(Continued)

FOREIGN PATENT DOCUMENTS

WO WO-2010115994 A1 10/2010
WO WO-2017222670 A1 12/2017

OTHER PUBLICATIONS

U.S. Appl. No. 16/311,413 U.S. Pat. No. 10,928,317, filed Dec. 19, 2018, Fiber-Optic Based Thermal Reflectance Material Property Measurement System and Related Methods.

(Continued)

*Primary Examiner* — Roy M Punnoose
(74) *Attorney, Agent, or Firm* — Robert J. Decker

(57) ABSTRACT

An apparatus related method for measuring a property of a target material. The system may include a pump device that generates a pump beam. A modulation device may receive the pump beam and generate a modulated pump beam by modulating an intensity amplitude of the pump beam, which may be directed to the target material. A probe device may generate a probe beam, which is directed to the target material. A part of the probe beam may be reflected off of the target material, and has similar frequency characteristic as the modulated pump beam. A detection device may detect the reflected probe beam and produce a signal. An analyzing device may receive the signal and calculate the target material property by comparing the modulated frequency characteristics of the signal to those of the pump beam. At least one of the pump and the probe beams may be infrared light.

18 Claims, 9 Drawing Sheets

Related U.S. Application Data

(60) Provisional application No. 62/353,263, filed on Jun. 22, 2016.

(52) U.S. Cl.
CPC .............. *G01N 21/1717* (2013.01); *G01N 2021/1731* (2013.01); *G01N 2201/06113* (2013.01)

(58) Field of Classification Search
USPC .......................................................... 356/36
See application file for complete search history.

(56) References Cited

U.S. PATENT DOCUMENTS

| | | | |
|---|---|---|---|
| 4,810,051 A | 3/1989 | Kieli | |
| 4,829,529 A | 5/1989 | Kafka | |
| 5,307,284 A | 4/1994 | Brunfeldt et al. | |
| 5,748,317 A | 5/1998 | Maris et al. | |
| 5,982,499 A * | 11/1999 | Chichester | G01N 21/55 356/417 |
| 6,175,421 B1 | 1/2001 | Fuchs et al. | |
| 6,268,916 B1 * | 7/2001 | Lee | G01N 21/211 356/369 |
| 6,323,951 B1 * | 11/2001 | Borden | G01N 21/1717 356/502 |
| 6,348,967 B1 | 2/2002 | Nelson et al. | |
| 6,741,346 B1 | 5/2004 | Gerstner et al. | |
| 6,795,198 B1 * | 9/2004 | Fuchs | G01B 11/0666 356/521 |
| 7,106,446 B2 * | 9/2006 | Nicolaides | G01N 21/636 356/445 |
| 7,502,104 B2 * | 3/2009 | Salnik | G01N 21/55 356/237.5 |
| 7,619,741 B2 | 11/2009 | Nicolaides et al. | |
| 8,264,693 B2 | 9/2012 | Stoica et al. | |
| 9,772,297 B2 * | 9/2017 | Nicolaides | G01N 21/9501 |
| 10,928,317 B2 | 2/2021 | Foley et al. | |
| 2003/0234932 A1 * | 12/2003 | Nicolaides | G01N 21/39 356/432 |
| 2004/0169859 A1 * | 9/2004 | Smith | G01N 21/4788 356/369 |
| 2006/0012791 A1 * | 1/2006 | Reinhorn | G01N 21/9501 356/237.1 |
| 2006/0215175 A1 * | 9/2006 | Yacoubian | G01N 21/9505 356/502 |
| 2008/0036998 A1 * | 2/2008 | Salnik | G01N 21/1717 356/36 |
| 2008/0225267 A1 * | 9/2008 | Murtagh | G01N 21/1717 356/365 |
| 2008/0304046 A1 * | 12/2008 | Lee | G01N 21/1717 356/51 |
| 2008/0304047 A1 * | 12/2008 | Lee | G02B 21/0064 356/51 |
| 2009/0033931 A1 * | 2/2009 | Murtagh | G01N 21/1717 356/317 |
| 2009/0084959 A1 | 4/2009 | Hudgings et al. | |
| 2015/0110150 A1 * | 4/2015 | Schmidt | G01N 21/1717 374/43 |
| 2019/0120753 A1 * | 4/2019 | Prater | H01J 37/226 |
| 2019/0219503 A1 | 7/2019 | Foley et al. | |

OTHER PUBLICATIONS

"U.S. Appl. No. 16/311,413, Non Final Office Action dated Mar. 23, 2020", 16 pgs.
"U.S. Appl. No. 16/311,413, Notice of Allowance dated Oct. 7, 2020", 8 pgs.
"U.S. Appl. No. 16/311,413, Notice of Allowance dated Nov. 27, 2019", 9 pgs.
"U.S. Appl. No. 16/311,413, Preliminary Amendment filed Dec. 19, 2018", 3 pgs.
"U.S. Appl. No. 16/311,413, Response filed Sep. 22, 2020 to Non Final Office Action dated Mar. 23, 2020", 28 pgs.
"International Application Serial No. PCT/US2017/032390, International Preliminary Report on Patentability dated Jan. 3, 2019", 13 pgs.
"International Application Serial No. PCT/US2017/032390, International Search Report dated Sep. 13, 2017", 4 pgs.
"International Application Serial No. PCT/US2017/032390, Written Opinion dated Sep. 13, 2017", 11 pgs.
Brunner, F D, et al., "A Terahertz Time-Domain Spectrometer for Simultaneous Transmission and Reflection Measurements at Normal Incidence", Optics Express, vol. 17, No. 23, (2009), 20684-20693.
Cahill, D G, "Analysis of Heat Flow in Layered Structures for Time-Domain Thermoreflectance", Review of Scientific Instruments vol. 75, (2004), 5119-5122.
Cahill, D G, et al., "Nanoscale Thermal Transport. II. 2003-2012", Applied Physics Reviews 1, (2014), 011305.
Cahill, D G, et al., "Thermometry and Thermal Transport in Micro/Nanoscale Solid-State Devices and Structures", Journal of Heat Transfer, vol. 124, (2002), 223-241.
Christofferson, J, et al., "Thermal Measurements of Active Semiconductor Micro-Structures Acquired through the Substrate Using Near IR Thermoreflectance", Microelectronics Journal, vol. 35, (2004), 791-796.
Costescu, R M, et al., "Thermal Conductance of Epitaxial Interfaces", Physical Review B vol. 67, (2003), 054302.
Culurciello, P O, et al., "Isolation Charge Pump Fabricated in Silicon on Sapphire CMOS Technology", Electronics Letters, vol. 41, No. 10, (2005), 590-592.
Culurciello, P O, et al., "Monolithic Digital Galvanic Isolation Buffer Fabricated in Silicon on Sapphire CMOS", Electronics Letters, vol. 41, No. 9, (2005), 526-528.
Fu, Z, et al., "An Ultra-Low Power Silicon-on-Sapphire ADC for Energy Scavenging Sensors", IEEE International Symposium on Circuits and Systems, IEEE ISCS, (2006), 1511-1514.
Fu, Z, et al., "Nano-Watt Silicon-On-Sapphire ADC Using 2C-1C Capacitor Chain", Electronics Letters, vol. 42, No. 6, (2006), 341-343.
Gaskins, J T, et al., "Thermal Conductance across Phosphonic Acid Molecules and Interfaces: Ballistic versus Diffusive Vibrational Transport in Molecular Monolayers", Journal of Physical Chemistry, vol. 119, (2015), 20931-20939.
Gorham, C S, et al., "Density Dependense of the Room Temperature Thermal Conductivity of Atomic Layer Deposition-Grown Amorphous Alumina (Al2O3)", Applied Physics Letters, vol. 104, (2014), 253107.
Gorham, C S, et al., "Ion Irradiation of the Native Oxide/Silicon Surface Increases the Thermal Boundary Conductance across Aluminum/Silicon Interfaces", Physical Review B, vol. 90, (2014), 024301.
Grahn, H T, et al., "Picosecond Ultrasonics", IEEE Journal of Quantum Electronics, vol. 25, No. 12, (1989), 2562-2569.
Hohensee, G T, et al., "Interpreting Picosceond Acoustics in the Case of Low Interface Stiffness", Review of Scientific Instruments, vol. 83, (2012), 114902.
Hopkins, P E, "Criteria for Cross-Place Dominated Thermal Transport in Multilayer Thin Film Systems During Modulated Laser Heating", Journal of Heat Transfer, vol. 32, (2010), 081302.
Hopkins, P E, et al., "Effects of Electron-Boundary Scattering on Changes in Thermoreflectance in Thin Metal Films Undergoing Intraband Excitations", Journal of Applied Physics, vol. 105, (2009), 093517.
Hopkins, P E, "Influence of Electron-Boundary Scattering on Thermoreflectance Calculations After Intra- and Interband Transitions Induced by Short-Pulsed Laser Absorption", Physical Review B, vol. 81, (2010), 035413.
Hopkins, P E, "Vacancy and Interface Effects on Phonon Thermal Transport in Oxide Nanostructures", Electronic Materials and Applications, (2016).
Hossoin, M A, et al., "Optical Characterization of Intrinsic Poly Silicon Film for Photovoltaic Application on Sapphire and Ti02

(56) References Cited

OTHER PUBLICATIONS

Substrate by HWCVD", International Conference on Electrical Engineering and Information and Communication Technology (ICEEICT, (2014), 1-4.
Incropera, F, et al., "Fundamentals of Heat and Mass Transfer", Wiley and Sons Inc., <https://books.google.com/books/about!Fundamentals_of_heat_and_mass_transfer.html?id=UAZRAAAAMAAJ>, (1996).
Jayatissa, A H, et al., "Characterization of Interface Layer of Silicon on Sapphire Using Spectroscopic Ellipsometry", Japanese Journal of Applied Physics, 36, (1997), 7152-7155.
Kaya, T, "Low-Voltage Temperature Sensor for Micro-Power Harvesters in Silicon-On-Sapphire CMOS", Electronics Letters, 42, (2006), 528-528.
Lane, D, "The Optical Properties and Laser Irradiation of Some Common Glasses", Journal of Physics D: Applied Physics, 23, (1990), 1727-1734.
Lippincott, E R, et al., "Infrared Studies on Polymorphs of Silicon Dioxibe and Germanium Dioxide", Journal of Research of the National Bureau of Standards, vol. 61, No. 1, (Jul. 1958), 61-70.
Malen, J A, et al., "Optical Measurement of Thermal Conductivity Using Fiber Aligned Frequency Domain Thermoreftectance", Journal of Heat Transfer, vol. 133, (2011), 081601.
Manasevit, H M, et al., "Single-Crystal Silicon on a Sapphire Substrate", Journal of Applied Physics, vol. 35, (1964), 1349-1351.
Nakamura, T, et al., "Silicon on Sapphire {SOS} Device Technology", Oki Technical Review, vol. 71, No. 4, (2004), 66-69.
Paddock, C A, et al., "Transient Thermoreftectance from Thin Metal Films", Journal of Applied Physics, vol. 60, (1986), 285-290.
Rosei, R, et al., "Temperature Modulation of the Optical Transitions Involving the Fermi Surface in Ag: Experimental", Physical Review B vol. 10, No. 2, (1974), 484-489.
Rosei, R, "Temperature Modulation of the Optical Transitions Involving the Fermi Surface in Ag: Theory", Physical Review B, vol. 10, No. 2, (1974), 474-483.
Rosei, R, et al., "Thermomodulation Spectra of Al, Au, and Cu", Physical Review B, vol. 5, No. 10, (1972), 3883-3894.
Ruoho, K, et al., "Measurement of Thin Film Thermal Conductivity Using the Laser Flash Method", Nanotechnology, vol. 26, (2015), 195706.

Schmidt, A J, et al., "A Frequency-Domain Thermoreflectance Method for the Characterization of Thermal Properties", Review of Scientific Instruments, vol. 80, (2009), 094901.
Schmidt, A J, et al., "Characterization of Thin Metal Films via Frequency-Domain Thermoreftectance", Journal of Applied Physics vol. 107, (2010), 024908.
Schmidt, A J, "Pump-Probe Thermoreftectance", Annual Review of Heat Transfer, vol. 16, (2013), 159-181.
Tang, W, et al., "A Low-Power Silicon-On-Sapphire Tunable Ultra-Wideband Transmitter", IEEE International Symposium on Circuits and Systems, IEEE ISCS, (2008), 1974-1977.
Thomas, M E, et al., "Infrared Transmission Properties of Sapphire, Spinel, Yttria, and ALON as a Function of Temperature and Frequency", Applied Optics, vol. 27, No. 2, (1988), 239-245.
Thomsen, C, et al., "Coherent Phonon Generation and Detection by Picosecond Light Pulses", Physical Review letters, vol. 53, No. 10, (Sep. 3, 1984), 989-992.
Thomsen, C, et al., "Surface Generation and Detection of Phonons by Picosecond Light Pulses", Physical Review B, vol. 34, No. 6,, (Sep. 15, 1986), 4129-4138.
Vermeersch, B, et al., "Time and Frequency Domain CCD-Based Thermoreftectance Techniques for High- Resolution Transient Thermal Imaging", 26th IEEE Semi-Therm Symposium, (2010), 228-234.
Wang, Y, et al., "Thermoreftectance of Metal Transducers for Time-Domain Thermoreftectance", Journal of Applied Physics, vol. 108, (2010), 043507.
Wilson, R B, et al., "Thermoreftectance of Metal Transducers for Optical Pump-Probe Studies of Thermal Properties", Optics Express, vol. 20, No. 27, (2012), 28829-28838.
Yang, J, et al., "Modeling Optical Absorption for Thermoreftectance Measurements", Journal of Applied Physics, vol. 119, (2016), 095107.
Yang, J, et al., "Thermal Conductance Imaging of Graphene Contacts", Journal of Applied Physics, vol. 116, (2014), 023515.
Zhao, D, et al., "Measurement Techniques for Thermal Conductivity and Interfacial Thermal Conductance of Bulk and Thin Film Materials", <https://arxiv.org/abs/1605.08469>, 64 pgs.

\* cited by examiner

FIBER-OPTIC BASED MATERIAL PROPERTY MEASUREMENT SYSTEM AND RELATED METHODS

RELATED APPLICATIONS

The present application is a continuation application of U.S. application Ser. No. 16/311,413, filed Dec. 19, 2018, which is a national stage filing of International Application No. PCT/US2017/032390, filed on May 12, 2017, which claims priority under 35 U.S.C § 119(e) from U.S. Provisional Application Ser. No. 62/353,263, filed Jun. 22, 2016, entitled "Fiber-Optic Based Material Property Measurement System and Related Methods"; the disclosures of which are incorporated by reference herein in their entirety.

FIELD OF THE INVENTION

The present invention relates generally to a fiber-optic based material property measurement system and related methods.

BACKGROUND

One of the most sought after characterization tests in thermal property testing is the ability to test properties at elevated temperatures in either simulated run-time environments or in situ during real time operation of parts. Examples of these types of measurements include the periodic characterization of thermal barrier coatings (TBC) or environmental barrier coatings (EBC) on aircraft engine components, such as turbine blades, over their lifetime, testing of microelectronic components both during the fabrication process as well as in operation and in situ characterization of material degradation due to radiation damage in reactor components.

In addition, silicon on sapphire (SOS) based material composites have emerged as revolutionary solutions to a wide array of problems centered around silicon-on-insulator (SOI) devices and technologies. The commonly used SOI platform is not used only because of raw performance, but also due to its ability to access the benefits of standard complementary metal-oxide-semiconductor (CMOS) processing; more specifically, CMOS processing offers high manufacturing yields, low power operation and high levels of integration. In fact, issues that plague traditionally engineered devices relying on the use of silicon handles, such as parasitic drain capacitance, electrical isolation, electromagnetic pulse insulation, and cyclic durability and hysteresis, could in principle be greatly reduced or eliminated if a more robust material could be used as the handle/substrate during CMOS processing.

These above mentioned issues that have plagued silicon (and GaAs) substrate use in CMOS have been virtually eliminated with the demonstration of epitaxial grown silicon on a substrate of sapphire ($Al_2O_3$), creating the SOS process [1]. Silicon grown onto the surface of sapphire is incredibly stable and offers virtually no hysteresis. Furthermore, in addition to being optically transparent in the visible and near IR, $Al_2O_3$ is a much better electrical insulator than silicon or GaAs (the resistivity of $Al_2O_3$ can be in excess of $10^{16}$ Ω-cm, providing as good of insulation as $SiO_2$), which yields superior electrical isolation and drastic reduction in parasitic losses. The stability of $Al_2O_3$ to high temperatures, aggressive chemistries, and high-energy radiation greatly out performs that of $SiO_2$, not to mention the thermal conductivity of $Al_2O_3$ is 20 times higher than that of fused silica [2, 3]. This has positioned SOS-based technologies to provide cutting edge solutions for RF applications, as several of the above-mentioned advantages of SOS have resulted in operation of RF components and devices (such as switches, mixers, etc.) operating to higher frequencies and lower power [2, 4]. However, even beyond these specific RF applications, SOS technology has allowed the realization of superior performance in analog-to-digital converters [5], monolithic digital isolation buffers [6], energy harvesting devices [7], charge pumps [8], and temperature sensors [9].

Clearly, SOS technologies offer immense potential in a wide array of technologies. Critical in all of these technologies is the accurate knowledge of the thickness of the film composite layers that are gown on the sapphire substrate, as this thickness dictates all static and dynamic performance metrics of the device layers. However, there is currently no non-destructive, non-contact metrology tool that can accurately measure the thickness of thin films grown on sapphire wafers, which has limited the SOS process by potentially lowering yields.

Traditionally implemented "non-destructive" techniques for accurate determination of film thickness have mainly been optical-based. For example, ellipsometry has proven useful for measuring the thickness of thin films on substrates, but the added difficulty of sapphire being transparent over a wide wavelength range can make ellipsometry difficult if the film on sapphire is too thin. Furthermore, the assumptions of the various optical properties of films that are necessary to analyze ellipsometry data can lead to large errors when the films are either too thin, unknown, or if multiple interfaces are in the measurement volume [10]. Additionally, and most notably for large scale processing applications, ellipsometry measurements can be time consuming and not amenable for inserting into production lines or existing processing procedures.

Other existing non-contact methods suffer the same fate as ellipsometry when attempting to provide a robust solution for film thickness measurements of SOS samples. For example, direct absorption methods (in which reflectivity is monitored) have been used to characterize the thickness of thin films, but suffer large errors when the media of interest are only weakly absorbing and the volumetric absorption decreases as thickness decreases, making thin films very difficult to characterize; this therefore requires long "integration times" of the electronics that severely limit the throughput of this characterization technique [13]. Furthermore, these techniques have primarily been operated in visible range (or near UV and near IR) where many films of interest and, for that matter, the sapphire substrates, are nearly completely transmissive.

Short-pulsed-based acoustic wave techniques (such as picosecond acoustics) [14-16] that also rely on measuring reflectivity and relating changes in the time-resolved reflectivity to acoustic wave propagation suffer from similar fates due to their requirements of localized absorption. While these techniques have proven robust to measure films with very small thicknesses (as thin as native oxide layers, ~2 nm) [17, 18], these techniques rely on spatially localized absorption, which proves nearly impossible for transmissive systems unless a metal film is coated on top. Furthermore, the use of a mechanical delay stage in this, or any transient reflectivity experiment utilizing short pulses, makes these techniques inherently limited by the movement of the stage; this is detrimental for integration into existing processes along with achieving the high throughput measurements required in this program.

Recent progress in pump-probe thermoreflectivity measurements [19, 20] has demonstrated promise in measuring the thickness of very thin films. Experiments based on thermoreflectivity rely on the principle of thermoreflectance [21-23], i.e., the relatively small change in reflectivity that occurs due to temperature perturbations (thermoreflectance coefficients are typically on the order of $10^{-5}$-$10^{-4}$ 1/K) [24-27]. Traditionally employed pump-probe thermoreflectance measurements have relied on short-pulsed systems and time varying the relative delay between the pump and probe [28, 29]. In this case, the picosecond time resolution makes the time decay of the thermoreflectance signal sensitive to small changes in thermal conductance that would arise from small changes in film thickness [30]. However, this approach relies on short-pulsed laser systems with relatively large footprints and mechanical delay stages, which, as mentioned previously, is detrimental for rapid determination of film thickness and "retrofitting" into established processes.

However, a close cousin to time domain thermoflectance monitors the thermoreflectivity response of a sample in the frequency domain [31]. This frequency domain thermoflectance (FDTR) method solely relies on a frequency dependent pump source that produces a modulated temperature rise on the sample on frequency f [32]. Therefore, continuous wave (cw) lasers can be used as the pump and probe beams, and the pump modulation even can be driven by digital modulation of the amplitude of the intensity of the pump beam at frequency f [33]. This alleviates the need for mechanical delays, both speeding up measurements of the thermoreflectance signal along with ensuring smaller, more stable laser systems (i.e., easier retrofitting into existing set ups). A FDTR measurement then consists of measuring the thermoreflectance signal (detected from lock in amplification) as a function of pump modulation frequency. Due to the high frequency of modulation that can be achieved in an FDTR experiment, the measured signal is sensitive to small changes in thermal mass that arise due to film thickness. In fact, previous works have used FDTR to measure the thickness of thin films on insulting substrates [34]. Furthermore, this experiment of CW modulated FDTR has been shown to be able to accurately measure thicknesses of thin film stacks including layers with encased single- and few-layer-graphene [33], which clearly demonstrates the promise of using FDTR to determine film thicknesses of thin films.

A schematic of an embodiment of an FDTR experiment 301 for measuring properties of a target material 321 is shown in FIG. 3. A cw laser produces a laser beam 310 which is separated into a pump beam 316 and probe beam 312 by optical device 323. The pump beam 316 is directed to a modulator 313 via optical component 331. The amplitude of the intensity of the pump beam 316 is modulated by modulator 313 to produce a modulated pump beam 314. The modulated pump beam 314 and probe beam 312 are directed to a focusing device 325 by optical components 333, 334, 332, 335, 324, 327 (for example, mirror or semi-reflective mirror). The focusing device 325 directs the modulated pump beam 314 and the probe beam to the target material 321. The probe beam 312 at least partially reflects from the target material 321, and is received by detector 329. The modulated pump beam 314 is at least partially absorbed by the target material 321, which results in local heating. The heating causes a change in the reflectance of the target material 321. As a result of the change in reflectance, the optical properties of a reflected probe beam 328 change, which is directed to the detector 329. To produce a FDTR measurement, the modulator changes the frequency of the modulation of the intensity of the modulated pump beam 314, which produces a reflected probe beam 328 having similar frequency characteristics. By comparing the frequency characteristics of the modulated pump beam 314 with the frequency characteristics of the reflected probe beam 328 with analyzing device 319, a measurement of the properties of target material 321, such as a thickness, can be made.

The issue with FDTR in its traditionally employed configuration for measuring SOS materials and multilayers in situ lies in the same realm as the other aforementioned reflectivity/absorptivity experiments: namely, FDTR is reliant on near-surface absorption and subsequent reflection of both pump and probe beams to ensure the enhanced sensitivity to small changes in thermal mass, and subsequently film thicknesses. In its traditional implementation, FDTR experiments require the deposition of a thin metal film transducer on top of the sample of interest, which serves to ensure absorption of the pump and probe within the optical skin depth of the metal (near surface). Clearly, this metal film transducer requirement will render traditionally used FDTR laser sources (i.e., wavelengths) and implementation unacceptable for in situ and non-contact characterization of thin films in SOS multilayer stacks.

In addition, existing FDTR methods require measurement devices that utilize free-space optics.

An example of an embodiment of an FDTR is shown in FIG. 3. Such an embodiment of the device require precise alignment and tuning, and require large components. The degree of complexity and large footprint precludes their use, for example, in situ.

An aspect of an embodiment of the present invention approach presents a major advancement in FDTR technology that will provide the opportunity for application for SOS, and for in situ measurements.

Overview

An aspect of an embodiment of the present invention solves the problem of, among other things, measuring properties, such as thickness, of target materials, such sapphire or SOS devices. An embodiment of the invention may also be made smaller such that it may be portable, or used in situ. Furthermore, an embodiment of the invention may achieve modulation speeds that are faster than typical FDTR devices, which allow for faster measurement of properties, such as thickness. Additionally, an embodiment of the invention may provide increased sensitivity to surface properties or the properties of very thin layers due to the increased modulation frequencies. An aspect of an embodiment of the present invention provides, but not limited thereto, a method for measuring at least one property of a target material using thermoreflectance. The method may comprise: generating a pump light beam at a pump wavelength with a pump device; generating a modulated pump beam by modulating an amplitude of an intensity of the pump light beam between at least a first modulation frequency and a second modulation frequency; directing at least a portion of the modulated pump beam to a manipulation portion of the target material; generating a probe beam at a probe wavelength with a probe device; and directing at least a portion of the probe beam to a probing portion of the target material, wherein at least a part of the portion of the probe beam is reflected off of the target material forming a reflected probe beam, wherein the reflected probe beam has a similar modulated frequency characteristic as the pump beam. The method may further comprise: directing at least a portion of the reflected probe beam to a detection device, wherein the detection devices generates a detection signal from the reflected probe beam; analyzing the detection signal with an analyzing device by receiving the detection signal with the analyzing device, and calculating the property of the target material by comparing the modulated frequency characteristics of the reflected probe beam to the modulated frequency characteristics of the pump beam; and wherein at least one of the pump wavelength and the probe wavelength is an infrared wavelength.

An aspect of an embodiment of the present invention provides, but not limited thereto, an apparatus for measuring at least one property of a target material using thermoreflectance. The apparatus may comprise: a pump device that generates a pump light beam at a pump wavelength; a first direction apparatus that directs the pump light beam to a modulation device, wherein the modulation device generates a modulated pump beam by modulating an amplitude of an intensity of the pump light beam between at least a first modulation frequency and a second modulation frequency; a second direction apparatus that directs at least a portion of the modulated pump beam to a manipulation portion of the target material; a probe device that generates a probe beam at a probe wavelength; a third direction apparatus that directs at least a portion of the probe beam to a probing portion of the target material, wherein at least a part of the portion of the probe beam is reflected off of the target material forming a reflected probe beam, wherein the reflected probe beam has a similar modulated frequency characteristic as the pump beam; a detection device that detects at least a portion of the reflected probe beam, and produces a detection signal from the reflected probe beam; an analyzing device receives the detection signal and calculates the property of the target material by comparing the modulated frequency characteristics of the reflected probe beam to the modulated frequency characteristics of the pump beam; and wherein at least one of the pump wavelength and the probe wavelength is an infrared wavelength.

An aspect of an embodiment of the present invention provides, but not limited thereto, an apparatus for measuring at least one property of a target material using thermoreflectance. The apparatus may comprise: a pump device that generates a pump light beam at a pump wavelength; a first direction apparatus that directs the pump light beam to a modulation device, wherein the modulation device generates a modulated pump beam by modulating an amplitude of the an intensity of the pump light beam between at least a first modulation frequency and a second modulation frequency, a second direction apparatus that directs at least a portion of the modulated pump beam to a manipulation portion of the target material; a probe device that generates a probe beam at a probe wavelength; a third direction apparatus that directs at least a portion of the probe beam to a probing portion of the target material, wherein at least a part of the portion of the probe beam is reflected off of the target material forming a reflected probe beam, wherein the reflected probe beam has a similar modulated frequency characteristic as the pump beam; a detection device that detects at least a portion of the reflected probe beam, and produces a detection signal from the reflected probe beam; an analyzing device receives the detection signal and calculates the property of the target material by comparing the modulated frequency characteristics of the reflected probe beam to the modulated frequency characteristics of the pump beam; and wherein the pump device, the modulation device, the first direction apparatus, the second direction apparatus, the probe device, the third direction apparatus comprise fiber optic devices.

An aspect of an embodiment of the present invention provides, but not limited thereto, an apparatus related method for measuring a property of a target material. The system may include a pump device that generates a pump beam. A modulation device may receive the pump beam and generate a modulated pump beam by modulating an intensity amplitude of the pump beam, which may be directed to the target material. A probe device may generate a probe beam, which is directed to the target material. A part of the probe beam may be reflected off of the target material, and has similar frequency characteristic as the modulated pump beam. A detection device may detect the reflected probe beam and produce a signal. An analyzing device may receive the signal and calculate the target material property by comparing the modulated frequency characteristics of the signal to those of the pump beam. At least one of the pump and the probe beams may be infrared light.

These and other objects, along with advantages and features of various aspects of embodiments of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings.

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

DETAILED DESCRIPTION OF EXEMPLARY EMBODIMENTS

Figure 1:
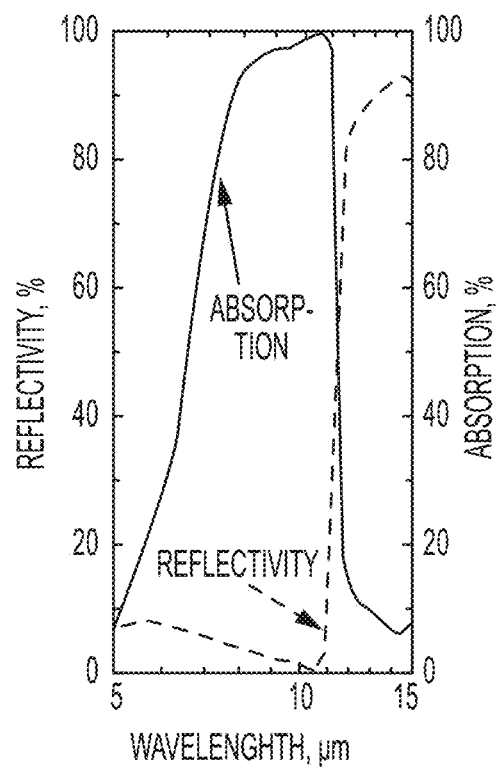
FIG. 1 represents the reflectivity and absorption for sapphire.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.

A detailed description of aspects of the present disclosure will now be provided with reference to the accompanying drawings. The drawings form a part hereof and show, by way of illustration, specific embodiments or examples. In referring to the drawings, like numerals represent like elements throughout the several figures.

Figure 4:
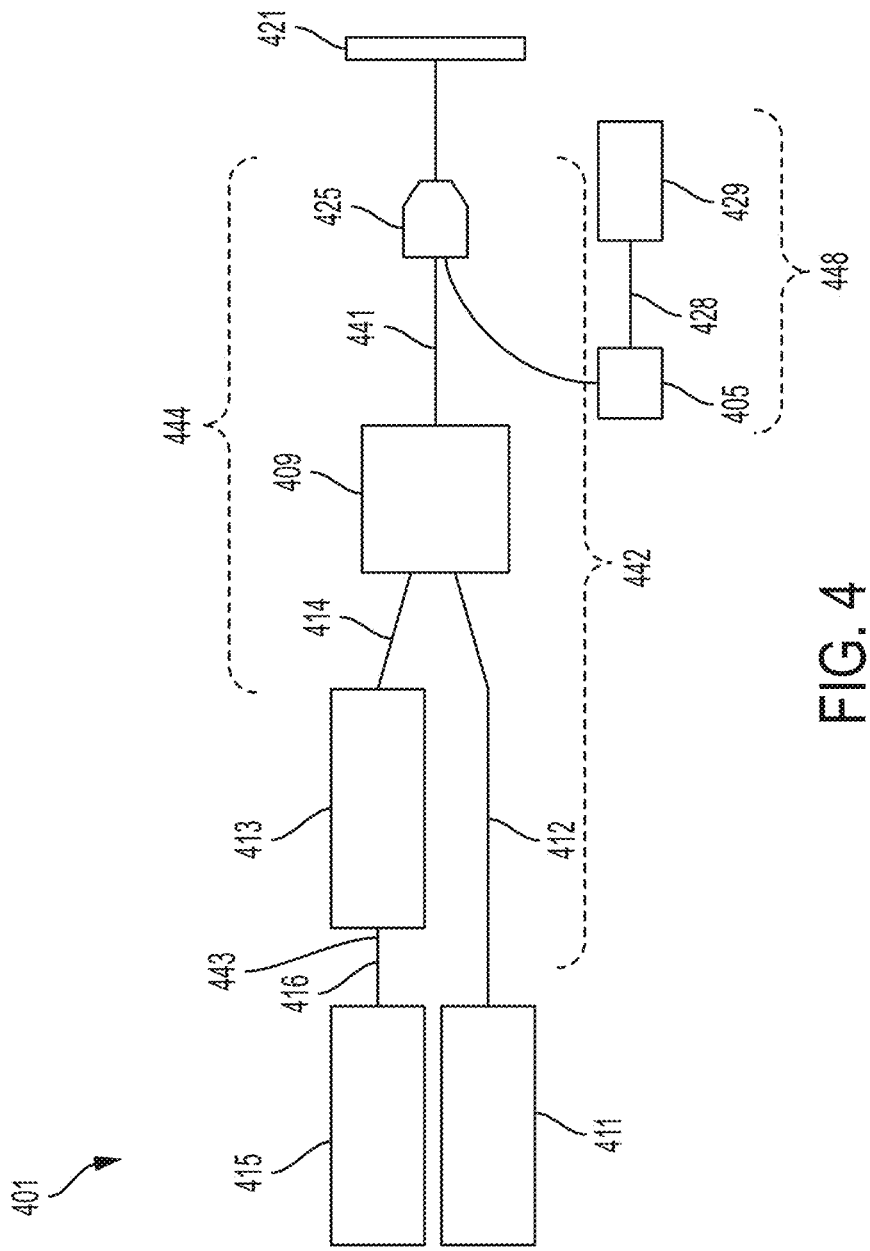
FIG. 4 schematically represents a FDTR device of an embodiment of the invention.

FIG. 4 schematically illustrates an exemplary embodiment of a frequency-domain thermoreflectance (FDTR) device 401 for measuring properties, such as thickness, of a target material 421.

A pump beam source 415 generates a pump beam 416, which is directed to modulator 413 via pump beam direction apparatus 443. The amplitude of the intensity of the pump beam 416 is modulated by modulator 413 to produce a modulated pump beam 414. The modulated pump beam 414 is directed to the target material 421 via a modulated pump beam direction apparatus 444. The modulated pump beam direction apparatus may include combining device 409 and focusing device 425 (for example, a microscope objective). The probe beam 412 and modulated pump beam 414 may be combined by combining device 409 into combined beam 441.

A probe beam source 411 generates a probe beam 412, which is directed to the source via a probe beam direction apparatus 442. The probe beam direction apparatus may include combining device 409 and focusing device 425 (e.g., focusing device).

The probe beam 412 at least partially reflects from the target material 421, creating a reflected probe beam 428. The reflected probe beam 428 is received by detector 429 via a reflected probe beam direction apparatus 448. The reflected probe beam direction apparatus 448 may include focusing device 425. The reflected probe beam direction apparatus 448 may include an optical isolator 405 to isolate the reflected probe beam 428 from other signals.

The modulated pump beam 414 is at least partially absorbed by the target material 421, which results in surface heating. The heating causes a change in the reflectance of the target material 421. As a result of the change in reflectance due to temperature change, the optical properties of a reflected probe beam 428 change, which is detected by the detector 429. To produce a FDTR measurement, the modulator changes the frequency of the modulation of the intensity of the modulated pump beam 414, for example by sweeping between a first and a second modulation frequency, which produces a reflected probe beam 428 having similar frequency characteristics. By comparing the frequency characteristics of the modulated pump beam 414 with the frequency characteristics of the reflected probe beam 428 detected by detector 429, a measurement of the properties of target material 421, such as a thickness, can be made.

Figure 2:
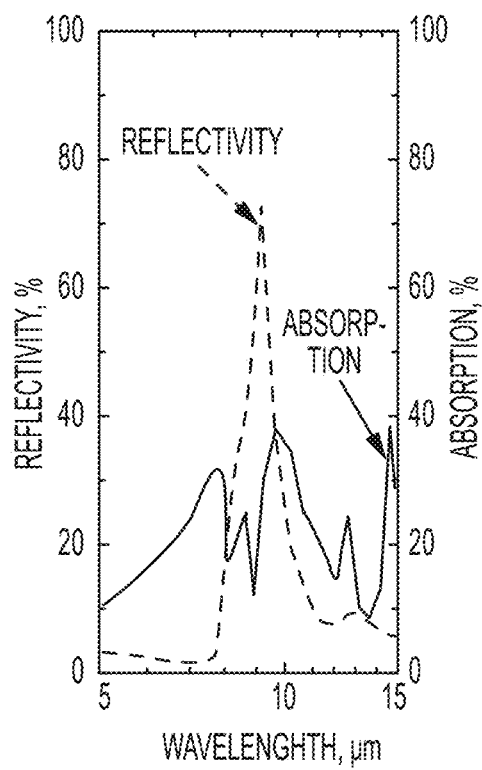
FIG. 2 represents the reflectivity and absorption for $SiO_2$.
Figure 3:
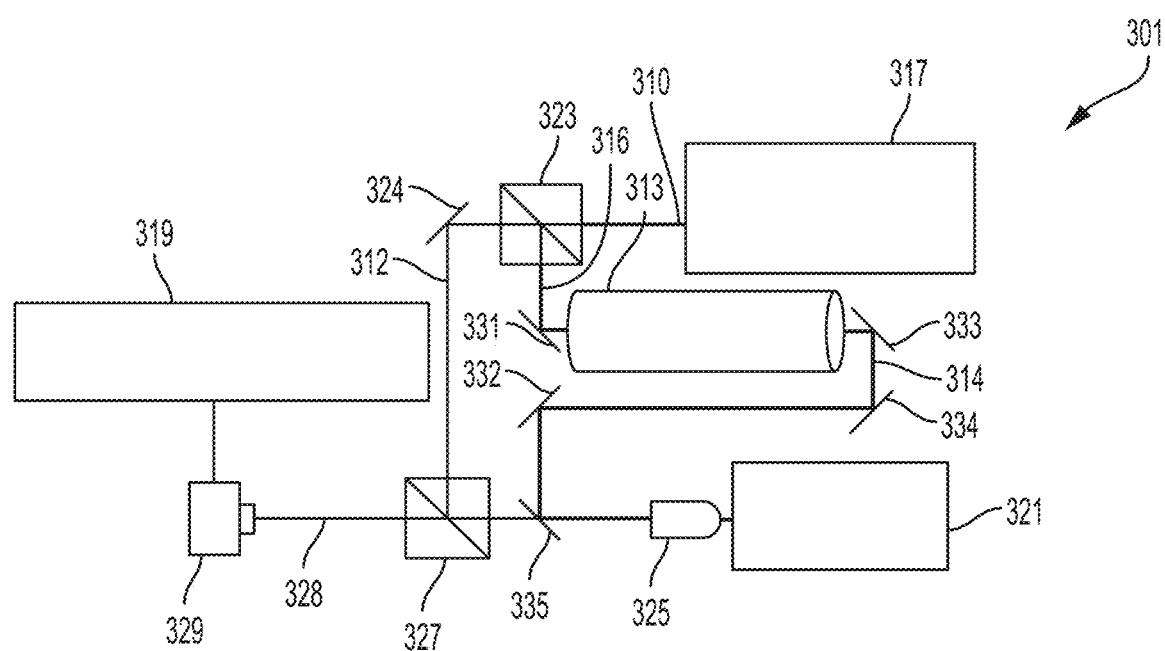
FIG. 3 schematically represents an example of an embodiment of an FDTR device.

It should be appreciated that the target material 421 may include sapphire, such as SOS. As discussed above, typical FDTR device are operated in visible range (or near UV and near IR) where films of interest, such as a sapphire substrates, are nearly completely transmissive. FIGS. 1 and 2 show the reflectivity and absorption for sapphire and $SiO_2$, respectively. Sapphire experiences coupling between infrared (IR) photons and optical phonons, known as phonon-polaritons. Excitation of these phonon-polaritons can be achieved through direct IR irradiation of, for example, oxide films, nitride films and sapphire substrates. The result is that sapphire becomes absorptive to irradiating light, which is necessary to create heating and thus reflectivity changes for FDTR. In addition, the temperature rise of the sapphire from the phonon-polariton absorption mechanism relaxes nearly instantly, for example, in less than a nanosecond, which allows for quicker modulation, and faster measurement of properties such as thickness.

Therefore, it shall be appreciated that invention may use light that is at least partially absorptive to sapphire, such as IR light, as the pump beam. In one embodiment, the pump beam wavelength may be in the range about 200 nm to about 15 μm. The pump beam wavelength may further be in the range of about 5 μm to about 15 μm. The pump beam wavelength may further be in the range of about 7 μm to about 13 μm. The pump beam wavelength may further be in the range of about 8 μm to about 12 μm. The pump beam wavelength may further be in the range of about 10 μm to about 12 μm. The pump beam wavelength may further be about 1550 nm. The pump beam wavelength may further be in the range of about 720 nm to about 890 nm. The pump beam wavelength may further be about 980 nm. The probe beam may be light that is at least partially reflective to, for example, sapphire. The probe beam wavelength may be in the range of about 200 nm to about 15 μm. The probe beam wavelength may be in the range of about 10 μm to about 15 μm. The probe beam wavelength may further be in the range of about 11 μm to about 15 μm. The probe beam wavelength may further be in the range of about 10 μm to about 13 μm. The probe beam wavelength may further be in the range of about 11 μm to about 13 μm. The probe beam wavelength may further be in the range of about 10 μm to about 12 μm. The probe beam wavelength may further be in the range of about 11 μm to about 12 μm. The probe beam wavelength may further be in the range of about 720 nm to about 890 nm. The probe beam wavelength may further be 980 nm. The probe beam wavelength may further be about 1550 nm. In one embodiment of the invention, the pump beam wavelength may be different from the probe beam wavelength. In a further embodiment of the invention, the pump beam wavelength may be larger than the probe beam wavelength. In a further embodiment of the invention, the pump beam wavelength may be smaller than the probe beam wavelength. In one embodiment of the invention, the pump beam wavelength may be the same as the probe beam wavelength. The modulation frequencies may be in the range of about 10 Hz to about 100 GHz. The modulation frequencies may further be in the range of about 10 Hz to about 40 GHz. The modulation frequencies may further be in the range of about 10 Hz to about 5 GHz. The modulation frequencies may further be in the range of about 0 Hz to about 1 GHz. The modulation frequencies may further be in the range of about 1 GHz to about 100 GHz. The modulation frequencies may further be in the range of about 1 GHz to about 40 GHz. The modulation frequencies may further be in the range of about 1 GHz to about 5 GHz. The modulation frequencies may be in the range of about 5 GHz to about 100 GHz. Still yet, the modulation frequencies may be in the range of about 5 GHz to about 40 GHz. The spot size may be in the range from 1 μm to 50 μm (the spot size may be less than 1 μm or greater than 50 μm).

It shall also be appreciated that FDTR device 401 may utilize free space optical components. It may also utilize fiber optic components. For example, the pump beam direction apparatus 443, the modulated pump beam direction apparatus 444, the probe beam direction apparatus 442, and the reflected probe beam direction apparatus 448 may include fiber optic devices. The pump beam source 415 and the probe beam source 411 may be fiber lasers, such as fiber coupled lasers or in-fiber lasers. The pump beam source 415 and the probe beam source 411 may be single mode fiber lasers, or multimode fiber lasers. The modulator 413 may be an in-fiber modulation device. The combining device 409 and focusing device 425 may also be fiber optic devices. The focusing device may be a fiber coupled objective lens. The optical isolator 405 may be a fiber optic isolator. By using fiber optic devices, the FDTR device 401 may be made smaller than traditional FDTR devices. It may be sufficiently small and durable such to be used in situ.

Figure 5:
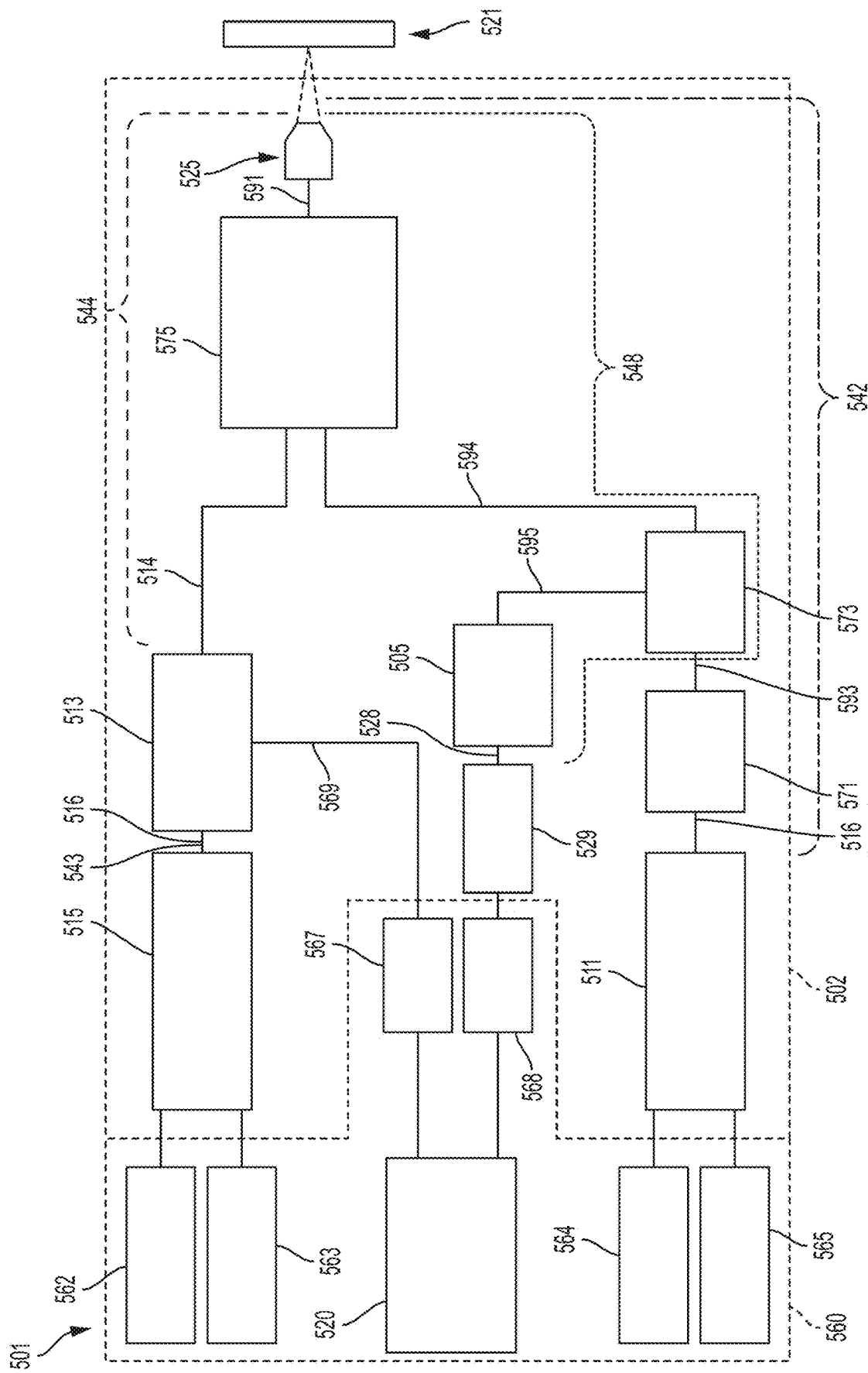
FIG. 5 schematically represents a FDTR device of an embodiment of the invention.

FIG. 5 schematically illustrates another exemplary embodiment of a FDTR device 501 for measuring properties, such as thickness, of a target material 521.

A pump beam source 515 generates a pump beam 516, which is directed to modulator 513 via pump beam direction apparatus 543. The amplitude of the intensity of the pump beam 516 is modulated by modulator 513 to produce a modulated pump beam 514. The modulated pump beam 514 is directed to the target material 521 via a modulated pump beam direction apparatus 544. The modulated pump beam direction apparatus may include combining device 575 and focusing device 525. The combining device 575 may be a wavelength division multimeter (WMD).

A probe beam source 511 generates a probe beam 512, which is directed to the source via a probe beam direction apparatus 542. The probe beam direction apparatus may include combining device 575 and focusing device 525. The probe beam direction apparatus may also include optical isolator 571, which outputs probe beam 593. The probe beam direction apparatus may include optical circulator 573, which outputs probe beam 594.

The probe beam 512 at least partially reflects from the target material 521, creating a reflected probe beam 528. The reflected probe beam 528 received by detector 529 via a reflected probe beam direction apparatus 548. The reflected probe beam direction apparatus 548 may include combining device 575, which outputs reflected probe beam 595, and focusing device 525. The reflected probe beam direction apparatus 548 may include an optical isolator 505 to isolate the reflected probe beam 528 from other signals. The reflected probe beam direction apparatus 548 may also include optical circulator 573. The probe beam 512 and modulated pump beam 514 may be combined by combining device 575 into combined beam 591.

The modulated pump beam 514 is at least partially absorbed by the target material 521, which results in surface heating. The heating causes a change in the reflectance of the target material 521. As a result of the change in reflectance due to temperature change, the optical properties of a reflected probe beam 528 change, which is detected by the detector 529. To produce a FDTR measurement, the modulator changes the frequency of the modulation of the intensity of the modulated pump beam 514, for example by sweeping between a first and a second modulation frequency, which produces a reflected probe beam 528 having similar frequency characteristics. By comparing the frequency characteristics of the modulated pump beam 514 with the frequency characteristics of the reflected probe beam 528 detected by detector 529, a measurement of the properties of target material 521, such as a thickness, can be made.

Optical components 502 of the FDTR device 501 may be controlled by electrical components 560. The pump source 515 may be controlled by laser diode drive 562 and thermoelectric control module 563. The probe source 515 may be controlled by laser diode drive 564 and thermoelectric control module 565. The modulator 513 may be controlled by vector network analyzer (VNA) 520. A modulation signal may be amplified by power amplifier 567, for example, an RF power amplifier, which produces a drive signal 569, for example, an RF drive signal. The detector 529 may be a photodiode, for example an InGaAs photodiode. The detector 529 supplies a detection signal from the reflected probe beam 528 to the VNA 520. The detection signal may be supplied via an amplifier 568, for example, a low noise RF amplifier. The VNA 520 performs the comparison between the properties of the modulated pump beam and the reflected probe beam.

It should be appreciated that the target material 521 may include sapphire, such as SOS. Therefore, it shall be appreciated that invention may use light that is at least partially absorptive to sapphire, such as IR light, as the pump beam. In one embodiment, the pump beam wavelength may be in the range about 200 nm to about 15 µm. The pump beam wavelength may further be in the range of about 5 µm to about 15 µm. The pump beam wavelength may further be in the range of about 7 µm to about 13 µm. The pump beam wavelength may further be in the range of 8 µm to 12 µm. The pump beam wavelength may further be in the range of about 10 µm to about 12 µm. The pump beam wavelength may further be about 1550 nm. The pump beam wavelength may further be in the range of about 720 nm to about 890 nm. The pump beam wavelength may further be about 980 nm. The probe beam may be light that is at least partially reflective to, for example, sapphire. The probe beam wavelength may be in the range of about 200 nm to about 15 µm. The probe beam wavelength may be in the range of about 10 µm to about 15 µm. The probe beam wavelength may further be in the range of about 11 µm to about 15 µm. The probe beam wavelength may further be in the range of about 10 µm to about 13 µm. The probe beam wavelength may further be in the range of about 11 µm to about 13 µm. The probe beam wavelength may further be in the range of about 10 µm to about 12 µm. The probe beam wavelength may further be in the range of about 11 µm to about 12 µm. The probe beam wavelength may further be in the range of about 720 nm to about 890 nm. The probe beam wavelength may further be about 980 nm. The probe beam wavelength may further be about 1550 nm. In one embodiment of the invention, the pump beam wavelength may be different from the probe beam wavelength. In a further embodiment of the invention, the pump beam wavelength may be larger than the probe beam wavelength. In a further embodiment of the invention, the pump beam wavelength may be smaller than the probe beam wavelength. In one embodiment of the invention, the pump beam wavelength may be the same as the probe beam wavelength. The modulation frequencies may be in the range of about 10 Hz to about 100 GHz. The modulation frequencies may further be in the range of about 10 Hz to about 40 GHz. The modulation frequencies may further be in the range of about 10 Hz to about 5 GHz. The modulation frequencies may further be in the range of about 10 Hz to about 1 GHz. The modulation frequencies may further be in the range of about 1 GHz to about 100 GHz. The modulation frequencies may further be in the range of about 1 GHz to about 40 GHz. The modulation frequencies may further be in the range of about 1 GHz to about 5 GHz. The modulation frequencies may be in the range of 5 about GHz to about 100 GHz. Still yet, the modulation frequencies may be in the range of about 5 GHz to about 40 GHz. The spot size may be in the range from 1 µm to about 50 µm (the spot size may be less than 1 µm or greater than 50 µm).

It shall also be appreciated that FDTR device 501 may utilize free space optical components. It may also utilize fiber optic components. For example, the pump beam direction apparatus 543, the modulated pump beam direction apparatus 544, the probe beam direction apparatus 542, and the reflected probe beam direction apparatus 548 may include fiber optic devices. The pump beam source 515 and the probe beam source 511 may be fiber lasers, such as fiber coupled lasers or in-fiber lasers. The pump beam source 515 and the probe beam source 511 may be single mode fiber lasers, or multimode fiber lasers. The modulator 513 may be an in-fiber modulation device. The combining device 575 and focusing device 525 may also be fiber optic devices. The focusing device 525 may be a fiber coupled objective lens. The optical isolator 505 may be a fiber optic isolator. The optical isolator 571 may be a fiber optic isolator. The optical circulator 573 may be a fiber optic circulator. By using fiber optic devices, the FDTR device 501 may be made smaller than traditional FDTR devices. It may be sufficiently small and durable such to be used in situ.

Figure 6:
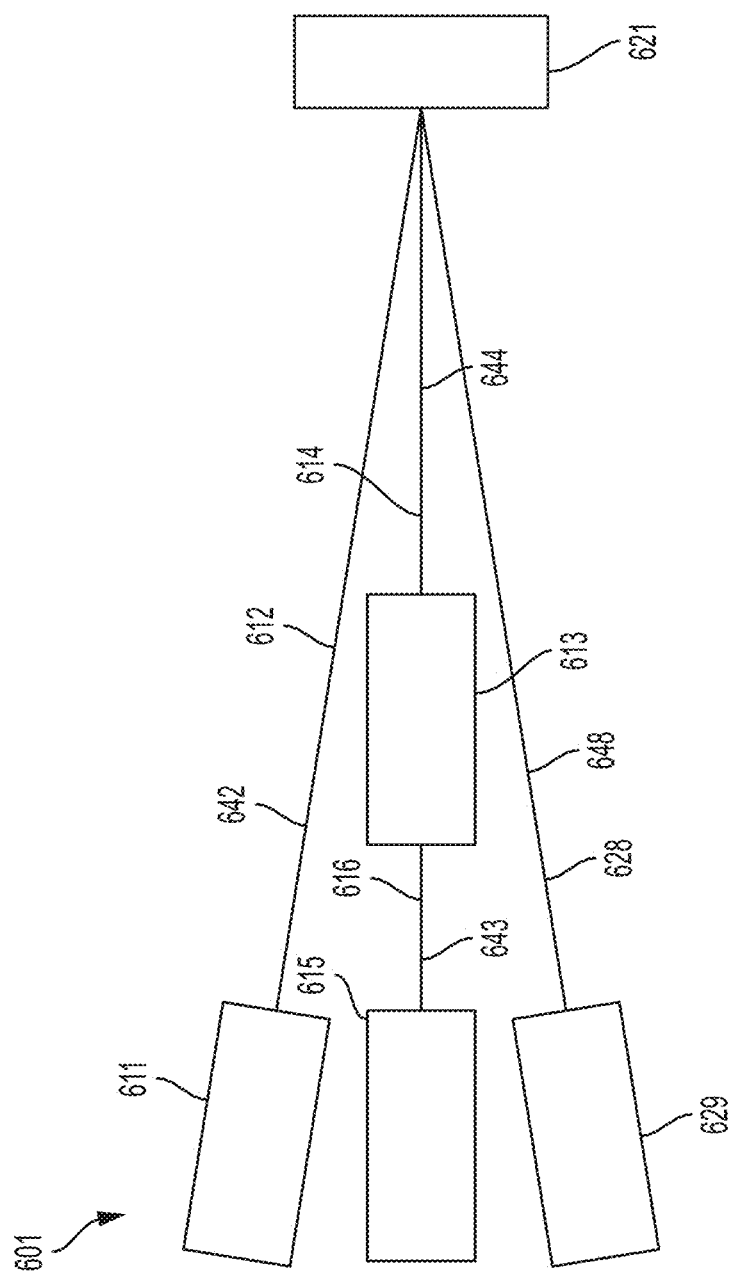
FIG. 6 schematically represents a FDTR device of an embodiment of the invention.

FIG. 6 schematically illustrates another exemplary embodiment of a FDTR device 601 for measuring properties, such as thickness, of a target material 621. Unlike FDTR devices 401 and 501, FDTR device 601 does not use a same beam path for the modulated pump beam and the probe beam.

A pump beam source 615 generates a pump beam 616, which is directed to modulator 613 via pump beam direction apparatus 643. The amplitude of the intensity of the pump beam 616 is modulated by modulator 613 to produce a modulated pump beam 614. The modulated pump beam 614 is directed to the target material 621 via a modulated pump beam direction apparatus 644. The modulated pump beam direction apparatus may include a modulated pump beam focusing device.

A probe beam source 611 generates a probe beam 612, which is directed to the source via a probe beam direction apparatus 642. The probe beam direction apparatus may include a probe beam focusing device.

The probe beam 612 at least partially reflects from the target material 621, creating a reflected probe beam 628. The reflected probe beam 628 received by detector 629 via a reflected probe beam direction apparatus 648. The reflected probe beam direction apparatus 648 may include a focusing device. The reflected probe beam direction apparatus 648 may include an optical isolator to isolate the reflected probe beam 628 from other signals.

The modulated pump beam 614 is at least partially absorbed by the target material 621, which results in surface heating. The heating causes a change in the reflectance of the target material 621. As a result of the change in reflectance due to temperature change, the optical properties of a reflected probe beam 628 change, which is detected by the detector 629. To produce a FDTR measurement, the modulator changes the frequency of the modulation of the intensity of the modulated pump beam 614, for example by sweeping between a first and a second modulation frequency, which produces a reflected probe beam 628 having similar frequency characteristics. By comparing the frequency characteristics of the modulated pump beam 614 with the frequency characteristics of the reflected probe beam 628 detected by detector 629, a measurement of the properties of target material 621, such as a thickness, can be made.

It should be appreciated that the target material 621 may include sapphire, such as SOS. Therefore, it shall be appreciated that invention may use light that is at least partially absorptive to sapphire, such as IR light, as the pump beam. In one embodiment, the pump beam wavelength may be in the range about 200 nm to 15 µm. The pump beam wavelength may further be in the range of 5 µm to 15 µm. The pump beam wavelength may further be in the range of 7 µm to 13 µm. The pump beam wavelength may further be in the range of 8 µm to 12 µm. The pump beam wavelength may further be in the range of 10 µm to 12 µm. The pump beam wavelength may further be 1550 nm. The pump beam wavelength may further be in the range of 720 nm to 890 nm. The pump beam wavelength may further be 980 nm. The probe beam may be light that is at least partially reflective to, for example, sapphire. The probe beam wavelength may be in the range of about 200 nm to about 15 µm. The probe beam wavelength may be in the range of about 10 µm to about 15 µm. The probe beam wavelength may further be in the range of about 11 µm to about 15 µm. The probe beam wavelength may further be in the range of about 10 µm to about 13 µm. The probe beam wavelength may further be in the range of about 11 µm to about 13 µm. The probe beam wavelength may further be in the range of about 10 µm to about 12 µm. The probe beam wavelength may further be in the range of about 11 µm to about 12 µm. The probe beam wavelength may further be in the range of about 720 nm to about 890 nm. The probe beam wavelength may further be about 980 nm. The probe beam wavelength may further be about 1550 nm. In one embodiment of the invention, the pump beam wavelength may be different from the probe beam wavelength. In a further embodiment of the invention, the pump beam wavelength may be larger than the probe beam wavelength. In a further embodiment of the invention, the pump beam wavelength may be smaller than the probe beam wavelength. In one embodiment of the invention, the pump beam wavelength may be the same as the probe beam wavelength. The modulation frequencies may be in the range of about 10 Hz to about 100 GHz. The modulation frequencies may further be in the range of about 10 Hz to about 40 GHz. The modulation frequencies may further be in the range of about 10 Hz to about 5 GHz. The modulation frequencies may further be in the range of about 10 Hz to about 1 GHz. The modulation frequencies may further be in the range of about 1 GHz to about 100 GHz. The modulation frequencies may further be in the range of about 1 GHz to about 40 GHz. The modulation frequencies may further be in the range of about 1 GHz to about 5 GHz. The modulation frequencies may be in the range of about 5 GHz to about 100 GHz. Still yet, the modulation frequencies may be in the range of about 5 GHz to about 40 GHz. The spot size may be in the range from about 1 µm to about 50 µm (the spot size may be less than 1 µm or greater than 50 µm).

It shall also be appreciated that FDTR device 601 may utilize free space optical components. It may also utilize fiber optic components. For example, the pump beam direction apparatus 643, the modulated pump beam direction apparatus 644, the probe beam direction apparatus 642, and the reflected probe beam direction apparatus 648 may include fiber optic devices. The pump beam source 615 and the probe beam source 611 may be fiber lasers, such as fiber coupled lasers or in-fiber lasers. The pump beam source 615 and the probe beam source 611 may be single mode fiber lasers, or multimode fiber lasers. The modulator 613 may be an in-fiber modulation device. The combining device focusing device may also be fiber optic devices. The modulated pump beam focusing device and the probe beam focusing device may be a fiber coupled objective lens. The optical isolator may be a fiber optic isolator. By using fiber optic devices, the FDTR device 601 may be made smaller than traditional FDTR devices. It may be sufficiently small and durable such to be used in situ.

Figures 8, 9:
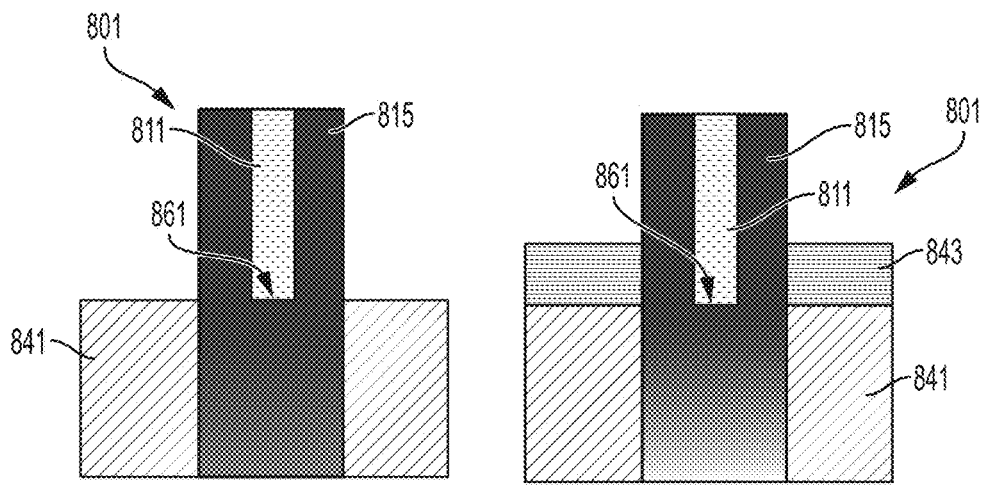
FIG. 8 schematically represents a modulated pump beam and a probe beam directed to a target material according to an embodiment of the invention.
FIG. 9 schematically represents a modulated pump beam and a probe beam directed to a target material according to an embodiment of the invention.
Figures 10, 11:
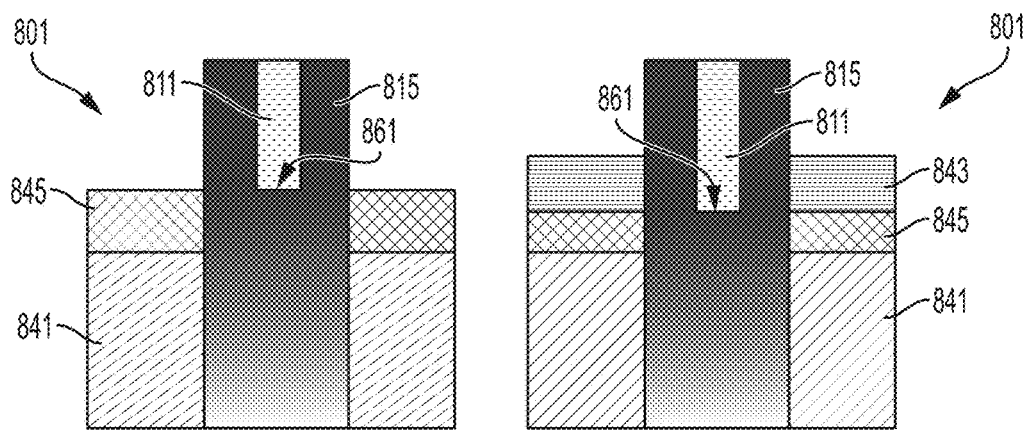
FIG. 10 schematically represents a modulated pump beam and a probe beam directed to a target material according to an embodiment of the invention.
FIG. 11 schematically represents a modulated pump beam and a probe beam directed to a target material according to an embodiment of the invention.

FIGS. 8-11 schematically illustrates an example of target material being tested with an embodiment of an FDTR device. A FDTR device 801 generates modulated pump beam 815, and probe beam 811. FIG. 8 shows target material 841, FIG. 9 shows target material 843, FIG. 10 shows target material 845, and FIG. 11 shows target material 843. Target material 841 may, for example be sapphire. Target material or layer 845 may be for example, an oxide layer. Target material or layer 843 may be, for example, a silicon layer.

FIG. 8 shows the modulated pump beam 815 is at least partially absorbed in the target material 841, and the probe beam 811 is at least partially reflected by the target material 841. The target material 841 is, for example, sapphire. The at least partial absorption of modulated pump beam 815 causes localized heating 861 of the target material 841. The shading of the modulated pump beam 815 shows that at least part of the pump beam is being absorbed as it travels through the target material 841. Therefore, a measurement of a property of the target material 841, for example a thickness, may be performed.

FIG. 9 shows the modulated pump beam 815 is at least partially absorbed in the layer 841, and the probe beam 811 is at least partially reflected by the layer 841. The layer 841 is, for example, sapphire. The at least partial absorption of modulated pump beam 815 causes localized heating 861 of the layer 841. The shading of the modulated pump beam 815 shows that at least part of the pump beam is being absorbed as it travels through the layer 841. Both the modulated pump beam 815 and the probe beam 811 are transparent to target material 843, for example, a silicon layer. The presence of target material 843, the effects of which are described further below, changes the characteristics of the reflected probe beam 811. Therefore, a measurement of a property of target material 843, for example a thickness, may be performed.

FIG. 10 shows the modulated pump beam 815 is at least partially absorbed in the target material 845, and the probe beam 811 is at least partially reflected by the target material 845. The target material 845 is, for example, an oxide layer. The at least partial absorption of modulated pump beam 815 causes localized heating 861 of the target material 845. The shading of the modulated pump beam 815 shows that at least part of the pump beam is being absorbed as it travels through the target material 845. Therefore, a measurement of a property of the target material 845, for example a thickness, may be performed.

FIG. 11 shows the modulated pump beam 815 is at least partially absorbed in layer 845, for example, an oxide layer, and the probe beam 811 is at least partially reflected by layer 845. The at least partial absorption of modulated pump beam 815 causes localized heating 861 of the layer 845. The shading of the modulated pump beam 815 shows that at least part of the pump beam is being absorbed as it travels through the layer 845. Both the modulated pump beam 815 and the probe beam 811 are transparent to target layer 843, for example, a silicon layer. The presence of target layer 843, the effects of which are described further below, changes the characteristics of the reflected probe beam 811. Therefore, a measurement of a property of target layer 843, for example a thickness, may be performed.

It should be appreciated that the configurations of FIGS. 9 and 11 take advantage of layer 843, for example, silicon, being transparent to IR light. The polaritons are excited on the surface of the target material 841, for example, sapphire, causing a modulated thermal event that is detected by the probe beam. Subsequently, the heat decays into both the target material 841 as well as layer 843. In the case where there is no film on top of the target material as shown in FIG. 8, the thermal signature will be distinctly different because of the lack of thermal mass transferring some of the heat away from target material.

The aforementioned embodiments demonstrate improved FDTR device. The invention may thus be used to measure properties, such as thickness, of target materials, such sapphire or SOS devices. The invention may also be made smaller such that it may be portable, or used in situ. Furthermore, it may achieve modulation speeds that are faster than typical FDTR devices, which allow for faster measurement of properties, such as thickness. Additionally, it may provide increased sensitivity to surface properties or the properties of very thin layers due to the increased modulation frequencies.

EXAMPLES

Practice of an aspect of embodiments of the invention will be still more fully understood from the following examples and simulated results, which are presented herein for illustration only, and should not be construed as limiting the invention in any way.

Figure 7:
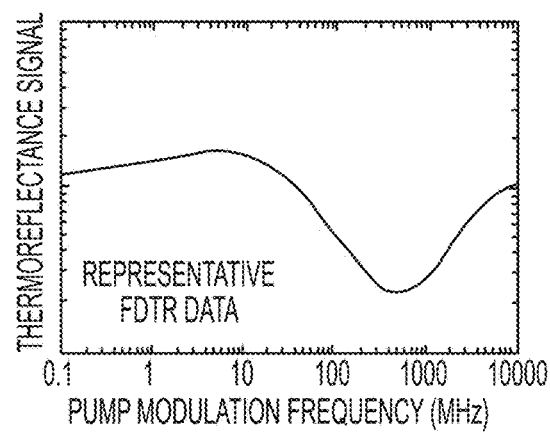
FIG. 7 represents an example of an FDTR data signal as a function of pump modulation frequency.

Reflectivity measurements from, for example, the embodiments of FIGS. 4-6, at wavelengths that adequately heat a sample and subsequently probe a frequency dependent reflectivity response, may be used to measure a thickness of various films on sapphire. For example, infrared wavelengths may be utilized. In an embodiment of the invention, infrared FDTR can take advantage of coupling between infrared photons and optical phonons, the result of which is known as phonon-polaritons. In an embodiment of the invention, excitation of these phonon-polaritons may be achieved through direct infrared irradiation of oxide films, nitride films, and a sapphire substrate. The subsequent temperature rise of, for example, sapphire from the phonon-polariton absorption mechanism, which may relax nearly instantly, for example, sub nanosecond relaxation, compared to the time/frequency scale of measurement, for example, ten nanoseconds or greater, may enable robust FDTR analysis to be applied, which may be ultrasensitive to small changes in film thickness. Using this knowledge, an embodiment of the invention may perform FDTR on various stacks of interest by choosing a pump wavelength that may excite phonon-polaritons, causing a heating event on the surface of a material in question, and a probe wavelength that may reflect such that the change in the probe thermoreflectivity response over a wide range of pump modulation frequencies is observed. Examples of pump modulation frequencies are included in FIG. 7, which shows an example of an FDTR data signal as a function of pump modulation frequency.

The ability to create a spatially localized heating event in oxide, nitride, and sapphire may allow an embodiment of the invention the flexibility to measure all of the film stacks discussed below. The examples below demonstrates rigorous simulations of an embodiment invention, and specifically demonstrates the sensitivity of the measurements made by an embodiment invention to film thicknesses. These simulations below are based on solutions to the multilayer heat equation in the frequency domain and accounts for detection from, for example, a lock in amplifier [29, 31, 32, 35]. In short, the examples discussed below are simulated experiments that represent the real sensitivity of an embodiment of the invention to film thickness. Clearly, an embodiment of the invention may offer exceptional sensitivity to film thickness of various visibly transparent films on sapphire substrates, as described in the examples below. Thus, an embodiment of the invention redefines the current state of the art for non-contact, non-destructive film thickness measurements of visible or transparent film stacks while offering nanometer resolution and rapid film thickness measurements on the order of seconds.

Example and Experimental Results Set No. 1:
Between a Monolayer and 300 nm of Epi-Silicon on Sapphire This embodiment of the invention takes advantage of silicon being transparent to infrared light. Polaritons may be excited on the surface of, for example, sapphire, causing a modulated thermal event that may be detected by a probe beam. Subsequently, heat decays into both a sapphire layer, as well as a silicon on top, as seen, for example, in the embodiment of FIG. 9. In an embodiment of the invention where there is no film on top of the sapphire, for example, as shown in the embodiment of FIG. 8, the thermal signature is distinctly different because of the lack of thermal mass transferring some of the heat away from a sapphire layer.

Figure 12:
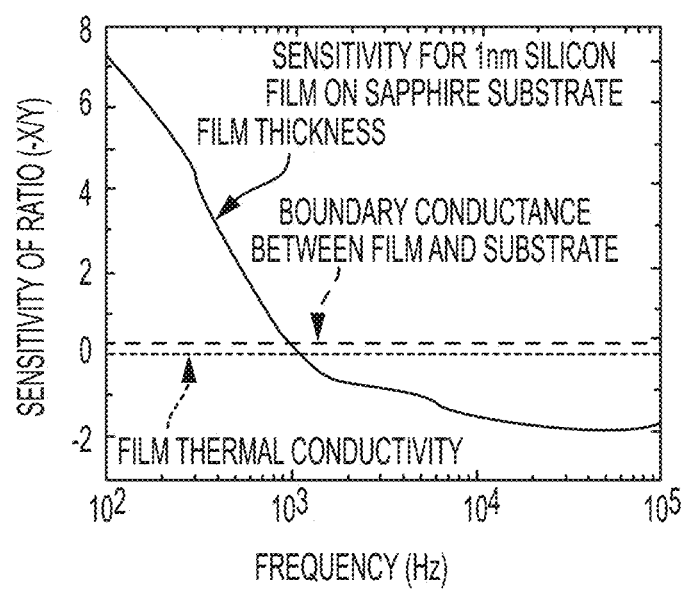
FIG. 12 represents experimental results of an embodiment of the invention using a monolayer and 300 nm of epi-silicon on sapphire.

The pertinent thermophysical properties of, for example, sapphire is known, namely heat capacity and thermal conductivity, and therefore the sensitivity of an embodiment of the invention to thickness of a silicon layer on top of the sapphire may be modeled. This example and the examples below assume that a sapphire substrate is infinite, which is appropriate given the relative dimensions of the sapphire substrate compared to the thin films. In this example, an embodiment of the invention is extremely sensitive to the thickness of the silicon layer even for a one-nanometer silicon film. This is shown in FIG. 12, which depicts the results of a simulation of an embodiment of the invention's sensitivity. This simulation and the simulations discussed in the examples below are based off of numerical solutions to the modulated heat equation, as detailed elsewhere for FDTR [31]. Since an embodiment of the invention will enable measurement the FDTR response of SOS system in the infrared, these sensitivity results are indicative of the sensitivity to film thickness. The interpretation of these sensitivity analyses in this example and the examples below is that the larger the value and larger the slope of these results means the embodiment of the invention is more sensitive to the parameter of interest, for example, film thickness. In these sensitivity analyses shown in the embodiment of FIG. 12, a film thickness of 1 nm for the film of interest is chosen so as to demonstrate that the invention is sensitive to film thickness, even in an ultra-thin regime. Therefore, the analysis clearly show that embodiments of the invention using an infrared FDTR technique may be extremely accurate in measuring the thickness of silicon films with film thickness down to 1 nm when on sapphire substrates.

Figure 13:
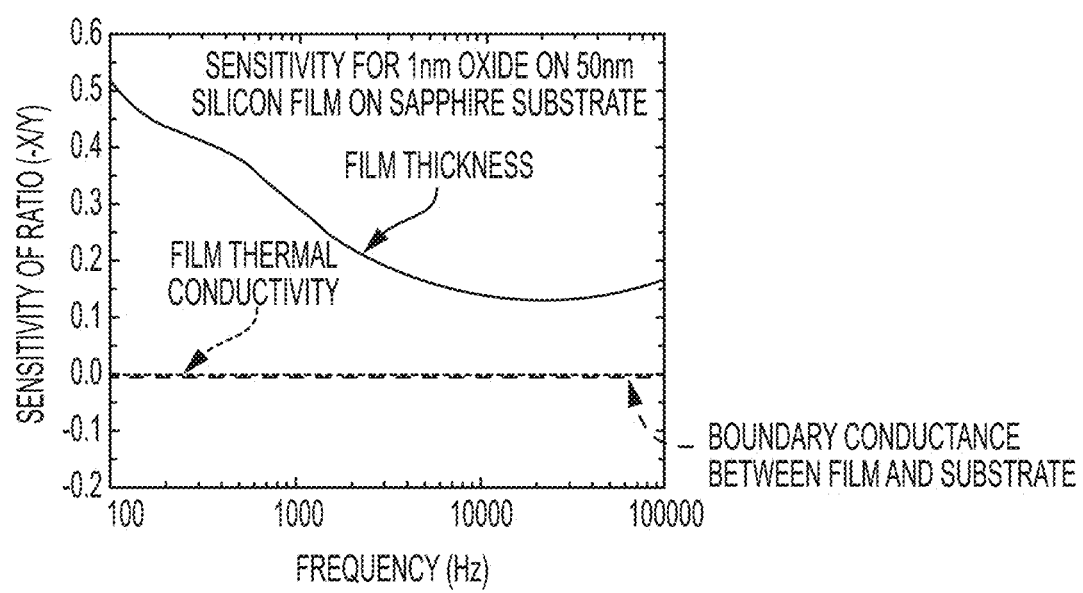
FIG. 13 represents experimental results of an embodiment of the invention using a thin oxide less than 50 nm and epi-silicon/sapphire.

Example and Experimental Results Set No. 2: Thin Oxide Less than 50 nm/Epi-Silicon/Sapphire In this embodiment of the invention, an oxide film on top of silicon or sapphire may be used as an absorbing layer. A representation of this scenario is shown, for example, in FIG. 10, where the oxide layer on top of the silicon or sapphire is used as an absorbing layer to create a modulated heating event. Because the properties of both sapphire and silicon are known from Example and Experimental Results Set No. 1, above, the resulting sensitivity are generated in FIG. 13.

In order to ensure that the energy is only deposited into the oxide film, the wavelength used for a pump beam in this embodiment of the invention is transparent to sapphire, but not the oxide film. This validates the assumption that the heating event is homogeneously occurring from the oxide layer and not by absorption in the silicon or the sapphire. In this regard, this embodiment of the invention relies on the findings from Example and Experimental Results Set No. 1 to appropriately choose the wavelengths necessary to perform the measurement. The predictive sensitivity of this embodiment of the invention to oxide films thickness is shown in FIG. 13, which again demonstrates the overwhelming sensitivity of the invention to measuring the thickness of 1 nm oxide on silicon or sapphire substrates.

Example and Experimental Results Set No. 3:
Oxide of Thickness Between 40 nm and 1.4 Microns on Sapphire This embodiment of the invention is similar to Example and Experimental Results Set No. 2, as depicted in, for example, FIG. 10. In this embodiment of the invention, absorption occurs in an oxide layer, and this embodiment of invention is therefore sensitive to the thickness of the oxide layer on sapphire. Again, drawing from Example and Experimental Results Set No. 1 ensures that this embodiment of the invention is only absorbing in the oxide layer and not in the underlying sapphire substrate in order to take the correct assumptions for the solution to the heat transfer problem.

Figure 14:
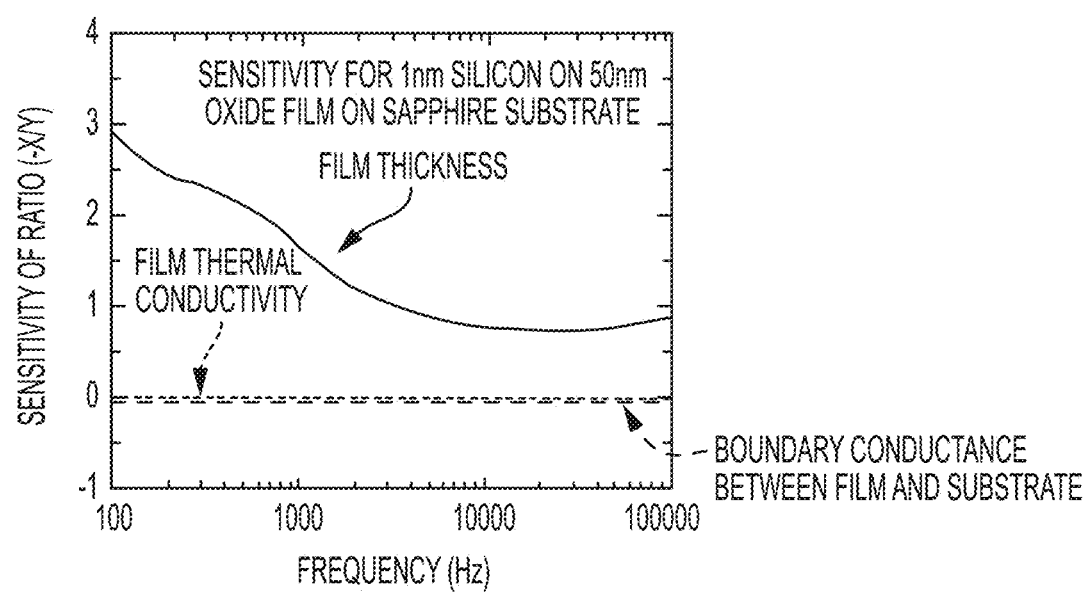
FIG. 14 represents experimental results of an embodiment of the invention using a monolayer and 300 nm of p-Si or a-Si/thin oxide/sapphire.

Example and Experimental Results Set No. 4:
Between a Monolayer and 300 nm of p-Si or a-Si/Thin Oxide/Sapphire In this embodiment of the invention, absorption occurs in an underlying oxide layer, and heat transfer into both a silicon layer above and a sapphire layer below affects how heat dissipates in this embodiment of the invention. FIG. 14, for example, shows that this embodiment of the invention is still sensitive to the thickness of the silicon layer on top of the oxide and sapphire stack even when absorbing in the underlying oxide layer. It should be noted that although this embodiment of the invention uses a 50 nm oxide layer to demonstrate the sensitivity, it is valid for all thickness of the oxide layer.

Example and Experimental Results Set No. 5:
Between a Monolayer and 200 nm of Nitride/Thin Oxide/Epi-Silicon/Sapphire In this embodiment of the invention, a thin oxide layer may be used as an absorbing layer in order to measure the thickness of a nitride film. Sensitivity for this embodiment of the invention is similar to Example and Experimental Results Set No. 4, above, with the p-Si or a-Si on thin oxide on sapphire.

Example and Experimental Results Set No. 6:
Between a Monolayer and 1000 nm Nitride/Oxide/Sapphire In this embodiment of the invention, an oxide layer is again used as an absorber for a pump beam, similar to Example and Experimental Results Set No. 5. Sensitivity of this embodiment of the invention is similar to the oxide on sapphire case.

Additional Examples

Example 1. A method for measuring at least one property of a target material using thermoreflectance. The method may comprise:
generating a pump light beam at a pump wavelength with a pump device;
generating a modulated pump beam by modulating an amplitude of an intensity of the pump light beam between at least a first modulation frequency and a second modulation frequency;
directing at least a portion of the modulated pump beam to a manipulation portion of the target material;
generating a probe beam at a probe wavelength with a probe device;
directing at least a portion of the probe beam to a probing portion of the target material, wherein at least a part of the portion of the probe beam is reflected off of the target material forming a reflected probe beam,
wherein the reflected probe beam has a similar modulated frequency characteristic as the pump beam;
directing at least a portion of the reflected probe beam to a detection device, wherein the detection devices generates a detection signal from the reflected probe beam;
analyzing the detection signal with an analyzing device by receiving the detection signal with the analyzing device, and calculating the property of the target material by comparing the modulated frequency characteristics of the reflected probe beam to the modulated frequency characteristics of the pump beam; and
wherein at least one of the pump wavelength and the probe wavelength is an infrared wavelength.

Example 2. The method of example 1, wherein the property of the target material is a thickness of the target material.

Example 3. The method of example 1, wherein the pump device comprises a pump fiber laser.

Example 4. The method of example 3, wherein the pump fiber laser comprises a fiber coupled laser or an in-fiber laser.

Example 5. The method of example 3, wherein the pump fiber laser is a single mode fiber laser or a multimode fiber laser.

Example 6. The method of example 1, wherein the probe device is a probe fiber laser.

Example 7. The method of example 6, wherein the probe fiber laser comprises a fiber coupled laser or an in-fiber laser.

Example 8. The method of example 6, wherein the probe fiber laser is a single mode fiber laser or a multimode fiber laser.

Example 9. The method of example 1, wherein generating a modulated pump light beam, directing at least a portion of the modulated pump light beam, and directing at least a portion of the probe light beam, further comprise utilizing fiber optic devices and not free-space optics.

Example 10. The method of example 9, wherein generating a modulated pump light beam further comprises directing at least a portion of the pump light beam to a modulation device using a fiber optic device and not free-space optics.

Example 11. The method of example 10, wherein the modulation device comprises an in-fiber modulation device.

Example 12. The method of example 1, wherein the test material comprises silicon on sapphire.

Example 13. The method of example 1, wherein the first modulation frequency and the second modulation frequency are different frequencies.

Example 14. The method of example 13, wherein modulating the pump beam further comprises modulating the amplitude of the intensity of the pump beam by sweeping between the first modulation frequency and the second modulation frequency.

Example 15. The method of example 1, wherein the first modulation frequency and the second modulation frequency are in the range from about 10 Hz to about 100 GHz.

Example 16. The method of example 1, wherein the first modulation frequency and the second modulation frequency are in the range from about 1 GHz to about 100 GHz.

Example 17. The method of example 1, wherein modulating the amplitude the intensity of the pump beam further comprises modulating the amplitude of the intensity of the pump beam to produce a sinusoidal wave, a square wave, a triangle wave, or a sawtooth wave.

Example 18. The method of example 1, wherein of the pump wavelength is equal to the probe wavelength.

Example 19. The method of example 1, wherein the pump wavelength is different from the probe wavelength.

Example 20. The method of example 1, wherein the pump wavelength is at least partially absorptive in sapphire.

Example 21. The method of example 1, wherein the pump wavelength is within the range of 200 nm to 15000 nm.

Example 22. The method of example 21, wherein the pump wavelength is within the range of about 10 µm to about 12 µm.

Example 23. The method of example 21, wherein the pump wavelength is within the range of about 720 nm to about 890 nm, or equal to about 980 nm.

Example 24. The method of example 1, wherein the probe wavelength is at least partially reflective in sapphire.

Example 25. The method of example 1, wherein the probe wavelength is an infrared wavelength.

Example 26. The method of example 25, wherein the probe wavelength is within the range of about 10 µm to about 15 µm.

Example 27. The method of example 25, wherein the probe wavelength is about 1550 nm.

Example 28. The method of example 1, wherein the analyzing device comprises a device capable of performing phase-sensitive detection and heterodyne detection.

Example 29. The method of example 1, wherein the analyzing device comprises a vector network analyzer.

Example 30. The method of example 1, further comprising generating a modulated pump magnitude signal representing a magnitude of the modulated pump beam between the at least first modulation frequency and the second modulation frequency, and a modulated pump phase signal representing a phase of the modulated pump beam between the at least first modulation frequency and the second modulation frequency; generating a reflected probe magnitude signal representing a magnitude of the reflected probe beam, and a reflected probe phase signal representing a phase of the reflected probe beam; wherein comparing the detection signal at different times of the modulated pump beam further comprises comparing the modulated pump magnitude signal and the modulated pump phase signal to the reflected probe magnitude signal and the reflected probe phase signal.

Example 31. The method of example 1, wherein directing at least the portion of the modulated pump beam to the manipulation portion of the target material generates a spot size of the pump beam on the manipulation portion of the target material; wherein the spot size is within the range of about 1 µm to about 50 µm.

Example 32. The method of example 1 (as well as subject matter of one or more of any combination of examples 2-31, in whole or in part), wherein the probing portion of the target material is within the manipulation portion of the target material.

Example 33. An apparatus for measuring at least one property of a target material using thermoreflectance. The apparatus may comprise:
a pump device that generates a pump light beam at a pump wavelength;
a first direction apparatus that directs the pump light beam to a modulation device,
wherein the modulation device generates a modulated pump beam by modulating an amplitude of an intensity of the pump light beam between at least a first modulation frequency and a second modulation frequency;
a second direction apparatus that directs at least a portion of the modulated pump beam to a manipulation portion of the target material;
a probe device that generates a probe beam at a probe wavelength;
a third direction apparatus that directs at least a portion of the probe beam to a probing portion of the target material, wherein at least a part of the portion of the probe beam is reflected off of the target material forming a reflected probe beam,
wherein the reflected probe beam has a similar modulated frequency characteristic as the pump beam;
a detection device that detects at least a portion of the reflected probe beam, and produces a detection signal from the reflected probe beam;
an analyzing device receives the detection signal and calculates the property of the target material by comparing the modulated frequency characteristics of the reflected probe beam to the modulated frequency characteristics of the pump beam; and
wherein at least one of the pump wavelength and the probe wavelength is an infrared wavelength.

Example 34. The apparatus of example 33, wherein the property of the target material is a thickness of the target material.

Example 35. The apparatus of example 33, wherein the pump device comprises a pump fiber laser.

Example 36. The apparatus of example 35, wherein the pump fiber laser comprises a fiber coupled laser or an in-fiber laser.

Example 37. The apparatus of example 35, wherein the pump fiber laser is a single mode fiber laser or a multimode fiber laser.

Example 38. The apparatus of example 33, wherein the probe device is a probe fiber laser.

Example 39. The apparatus of example 38, wherein the probe fiber laser comprises a fiber coupled laser or an in-fiber laser.

Example 40. The apparatus of example 38, wherein the probe fiber laser is a single mode fiber laser or a multimode fiber laser.

Example 41. The apparatus of example 33, wherein the modulation device, the first direction apparatus, the second direction apparatus, and the third direction apparatus, comprise fiber optic devices and not free-space optics.

Example 42. The apparatus of example 41, wherein a fourth direction apparatus directs the at least part of a portion of the reflected probe beam to the detection device.

Example 43. The apparatus of example 42, wherein the fourth direction apparatus comprises a fiber optic device and not free-space optics.

Example 44. The apparatus of example 33, wherein the test material comprises silicon on sapphire.

Example 45. The apparatus of example 33, wherein the first modulation frequency and the second modulation frequency are different frequencies.

Example 46. The apparatus of example 45, wherein the modulation device generates the modulated pump beam by modulating the amplitude of the intensity of the pump light beam by sweeping between the first modulation frequency and the second modulation frequency.

Example 47. The apparatus of example 33, wherein the first modulation frequency and the second modulation frequency are in the range from about 10 Hz to about 100 GHz.

Example 48. The apparatus of example 33, wherein the first modulation frequency and the second modulation frequency are in the range from about 1 GHz to about 100 GHz.

Example 49. The apparatus of example 33, wherein the modulation device generates the modulated pump beam by modulating the amplitude of the intensity of the pump light beam to produce a sinusoidal wave, a square wave, a triangle wave, or a sawtooth wave.

Example 50. The apparatus of example 33, wherein of the pump wavelength is equal to the probe wavelength.

Example 51. The apparatus of example 33, wherein the pump wavelength is different from the probe wavelength.

Example 52. The apparatus of example 33, wherein the pump wavelength is at least partially absorptive in sapphire.

Example 53. The apparatus of example 33, wherein the pump wavelength is within the range of about 200 nm to about 15000 nm.

Example 54. The method of example 53, wherein the pump wavelength is within the range of about 10 μm to about 12 μm.

Example 55. The apparatus of example 53, wherein the pump wavelength is within the range of about 720 nm to about 890 nm, or equal to about 980 nm.

Example 56. The apparatus of example 33, wherein the probe wavelength is at least partially reflective in sapphire.

Example 57. The apparatus of example 33, wherein the probe wavelength is an infrared wavelength.

Example 58. The apparatus of example 57, wherein the probe wavelength is within the range of about 10 μm to about 15 μm.

Example 59. The apparatus of example 57, wherein the probe wavelength is about 1550 nm.

Example 60. The apparatus of example 33, wherein the analyzing device comprises a device capable of performing phase-sensitive detection and heterodyne detection.

Example 61. The apparatus of example 33, wherein the analyzing device comprises a vector network analyzer.

Example 62. The apparatus of example 33, wherein modulating the amplitude of the intensity of the pump light beam further comprises generating a modulated pump magnitude signal representing a magnitude of the modulated pump beam between the at least first modulation frequency and the second modulation frequency, and a modulated pump phase signal representing a phase of the modulated pump beam between the at least first modulation frequency and the second modulation frequency; the detection signal further comprises a reflected probe magnitude signal representing a magnitude of the reflected probe beam, and a reflected probe phase signal representing a phase of the reflected probe beam; wherein the analyzing device receives the modulated pump magnitude signal, the modulated pump phase signal, the reflected probe magnitude signal, and the reflected probe phase signal, and wherein the analyzing device calculates the property of the target material by comparing the modulated pump magnitude signal and the modulated pump phase signal to the reflected probe magnitude signal and the reflected probe phase signal.

Example 63. The apparatus of example 33, wherein the portion of the modulated pump beam has a spot size on the manipulation portion of the target material; wherein the spot size is within the range of about 1 μm to about 50 μm.

Example 64. The apparatus of example 33 (as well as subject matter of one or more of any combination of examples 34-63, in whole or in part), wherein the probing portion of the target material is within the manipulation portion of the target material.

Example 65. An apparatus for measuring at least one property of a target material using thermoreflectance. The apparatus may comprise:

a pump device that generates a pump light beam at a pump wavelength;

a first direction apparatus that directs the pump light beam to a modulation device,
  wherein the modulation device generates a modulated pump beam by modulating an amplitude of the an intensity of the pump light beam between at least a first modulation frequency and a second modulation frequency, a second direction apparatus that directs at least a portion of the modulated pump beam to a manipulation portion of the target material;

a probe device that generates a probe beam at a probe wavelength;

a third direction apparatus that directs at least a portion of the probe beam to a probing portion of the target material, wherein at least a part of the portion of the probe beam is reflected off of the target material forming a reflected probe beam,
  wherein the reflected probe beam has a similar modulated frequency characteristic as the pump beam;

a detection device that detects at least a portion of the reflected probe beam, and produces a detection signal from the reflected probe beam;

an analyzing device receives the detection signal and calculates the property of the target material by comparing the modulated frequency characteristics of the reflected probe beam to the modulated frequency characteristics of the pump beam; and wherein the pump device, the modulation device, the first direction apparatus, the second direction apparatus, the probe device, the third direction apparatus comprise fiber optic devices.

Example 66. The apparatus of example 65, wherein the property of the target material is a thickness of the target material.

Example 67. The apparatus of example 65, wherein the pump device comprises a pump fiber laser.

Example 68. The apparatus of example 67, wherein the pump fiber laser comprises a fiber coupled laser or an in-fiber laser.

Example 69. The apparatus of example 67, wherein the pump fiber laser is a single mode fiber laser or a multimode fiber laser.

Example 70. The apparatus of example 65, wherein the probe device is a probe fiber laser.

Example 71. The apparatus of example 70, wherein the probe fiber laser comprises a fiber coupled laser or an in-fiber laser.

Example 72. The apparatus of example 70, wherein the probe fiber laser is a single mode fiber laser or a multimode fiber laser.

Example 73. The apparatus of example 65, wherein the modulation device, the first direction apparatus, the second direction apparatus, and the third direction apparatus, comprise fiber optic devices and not free-space optics.

Example 74. The apparatus of example 73, wherein a fourth direction apparatus directs the at least part of a portion of the reflected probe beam to the detection device.

Example 75. The apparatus of example 74, wherein the fourth direction apparatus comprises a fiber optic device and not free-space optics.

Example 76. The apparatus of example 65, wherein the test material comprises silicon on sapphire.

Example 77. The apparatus of example 65, wherein the first modulation frequency and the second modulation frequency are different frequencies.

Example 78. The apparatus of example 77, wherein the modulation device generates the modulated pump beam by modulating the amplitude of the intensity of the pump light beam by sweeping between the first modulation frequency and the second modulation frequency.

Example 79. The apparatus of example 65, wherein the first modulation frequency and the second modulation frequency are in the range from about 10 Hz to about 100 GHz.

Example 80. The apparatus of example 65, wherein the first modulation frequency and the second modulation frequency are in the range from about 1 GHz to about 100 GHz.

Example 81. The apparatus of example 65, wherein the modulation device generates the modulated pump beam by modulating the amplitude of the intensity of the pump light beam to produce a sinusoidal wave, a square wave, a triangle wave, or a sawtooth wave.

Example 82. The apparatus of example 65, wherein at least one of the pump wavelength and the probe wavelength is an infrared wavelength.

Example 83. The apparatus of example 65, wherein of the pump wavelength is equal to the probe wavelength.

Example 84. The apparatus of example 65, wherein the pump wavelength is different from the probe wavelength.

Example 85. The apparatus of example 65, wherein the pump wavelength is at least partially absorptive in sapphire.

Example 86. The apparatus of example 65, wherein the pump wavelength is within the range of about 200 nm to about 15000 nm.

Example 87. The apparatus of example 86, wherein the pump wavelength is within the range of about 10 µm to about 12 µm.

Example 88. The apparatus of example 86, wherein the pump wavelength is within the range of about 720 nm to about 890 nm, or equal to about 980 nm.

Example 89. The apparatus of example 65, wherein the probe wavelength is at least partially reflective in sapphire.

Example 90. The apparatus of example 65, wherein the probe wavelength is an infrared wavelength.

Example 91. The apparatus of example 90, wherein the probe wavelength is within the range of about 10 µm to about 15 µm.

Example 92. The method of example 90, wherein the probe wavelength is about 1550 nm.

Example 93. The apparatus of example 65, wherein the analyzing device comprises a device capable of performing phase-sensitive detection and heterodyne detection.

Example 94. The apparatus of example 65, wherein the analyzing device comprises a vector network analyzer.

Example 95. The apparatus of example 65, wherein modulating the amplitude of the intensity of the pump light beam further comprises generating a modulated pump magnitude signal representing a magnitude of the modulated pump beam between the at least first modulation frequency and the second modulation frequency, and a modulated pump phase signal representing a phase of the modulated pump beam between the at least first modulation frequency and the second modulation frequency; the detection signal further comprises a reflected probe magnitude signal representing a magnitude of the reflected probe beam, and a reflected probe phase signal representing a phase of the reflected probe beam; wherein the analyzing device receives the modulated pump magnitude signal, the modulated pump phase signal, the reflected probe magnitude signal, and the reflected probe phase signal, and wherein the analyzing device calculates the property of the target material by comparing the modulated pump magnitude signal and the modulated pump phase signal to the reflected probe magnitude signal and the reflected probe phase signal.

Example 96. The apparatus of example 65, wherein the portion of the modulated pump beam has a spot size on the manipulation portion of the target material; wherein the spot size is within the range of about 1 µm to about 50 µm.

Example 97. The apparatus of example 65 (as well as subject matter of one or more of any combination of examples 66-96, in whole or in part), wherein the probing portion of the target material is within the manipulation portion of the target material.

Example 98. The method of using any of the devices, apparatuses, systems, assemblies, or their components provided in any one or more of examples 33-97.

Example 99. The method of providing instructions to use or operate of any of the devices, apparatuses, systems, assemblies, or their components provided in any one or more of examples 33-97.

Example 100. The method of manufacturing any of the devices, apparatuses, systems, assemblies, or their components provided in any one or more of examples 33-97.

Example 101. It is noted that machine readable medium or computer useable medium may be configured to execute the subject matter pertaining to system, devices, apparatuses or related methods disclosed in examples 1-97, as well as examples 98-100.

Example 102. An apparatus including subject matter of one or more of any combination of examples 33-97, in whole or in part.

PUBLICATIONS

The following patents, applications and publications as listed below and throughout this document may utilize aspects disclosed in the following references, applications, publications and patents and which are hereby incorporated by reference herein in their entirety (and which are not admitted to be prior art with respect to the present invention by inclusion in this section):

1. H. M. Manasevit and W. J. Simpson, "Single-crystal silicon on a sapphire substrate," *Journal of Applied Physics* 35, 1349-1351 (1964).
2. T. Nakamura, H. Matsuhashi and Y. Nagatomo, "Silicon on sapphire (SOS) device technology," *Oki Technical Review* 71, 66-69 (2000).

3. F. Incropera and D. P. DeWitt, *Fundamentals of Heat and Mass Transfer* (Wiley and Sons, Inc., New York, 1996).
4. W. Tang, A. G. Andreou and E. Culurciello, "A low-power silicon-on-sapphire tunable ultra-wideband transmitter," *IEEE International Symposium on Circuits and Systems* 2008 IEEE ISCS, 1974-1977 (2008).
5. Z. Fu, P. Weerakoon and E. Culurciello, "Nano-Watt silicon-on-sapphire ADC using 2C-1C capacitor chain," *Electronics Letters* 42, 341-343 (2006).
6. E. Culurciello, P. O. Pouliquen, A. G. Andreou, K. Strohbehn and S. Jaskulek, "Monolithic digital galvanic isloation buffer fabricated in silicon on sapphire CMOS," *Electronics Letters* 41, 526-528 (2005).
7. Z. Fu and E. Culurciello, "An ultra-low power silicon-on-sapphire ADC for energy scavenging sensors," *IEEE International Symposium on Circuits and Systems* 2006 IEEE ISCS, 1514-1518 (2006).
8. E. Culurciello, P. O. Pouliquen and A. G. Andreou, "Isolation charge pump fabricated in silicon on sapphire CMOS technology," *Electronics Letters* 41, 590-592 (2005).
9. T. Kaya, H. Koser and E. Culurciello, "Low-voltage temperature sensor for micro-power harvesters in silicon-on-sapphire CMOS," *Electronics Letters* 42, 526-528 (2006).
10. A. H. Jayatissa, T. Yamaguchi, K. Sawada, M. Aoyama and F. Sato, "Characterization of interface layer of silicon on sapphire using spectroscopic ellipsometry," *Japanese Journal of Physics* 36, 7152-7155 (1997).
11. D. Lane, "The optical properties and laser irradiation of some common glasses," *Journal of Physics D: Applied Physics* 23, 1727-1734 (1990).
12. E. R. Lippincott, A. van Valkenburg, C. E. Weir and E. N. Bunting, "Infrared studies on polymorphs of silicon dioxide and germanium dioxide," *Journal of Research of the National Bureau of Standards* 61, 61-70 (1958).
13. M. A. Hossoin and B. M. Arora, "Optical characterization of intrinsic poly silicon film for photovoltaic application on sapphire and $TiO_2$ substrate by HWCVD," *International Conference on Electrical Engineering ann Information & Communication Technology* 2014 ICEE-ICT, 1-4 (2014).
14. H. T. Grahn, H. J. Maris and J. Tauc, "Picosecond ultrasonics," *Quantum Electronics, IEEE Journal of* 25, 2562-2569 (1989).
15. C. Thomsen, J. Strait, Z. Vardeny, H. J. Maris, J. Tauc and J. J. Hauser, "Coherent phonon generation and detection by picosecond light pulses," *Physical Review Letters* 53, 989-992 (1984).
16. C. Thomsen, H. T. Grahn, H. J. Maris and J. Tauc, "Surface generation and detection of phonons by picosecond light pulses," *Physical Review B* 34, 4129-4138 (1986).
17. C. S. Gorham, K. Hattar, R. Cheaito, J. C. Duda, J. T. Gaskins, T. E. Beechem, J. F. Ihlefeld, L. B. Biedermann, E. S. Piekos, D. L. Medlin and P. E. Hopkins, "Ion irradiation of the native oxide/silicon surface increases the thermal boundary conductance across aluminum/silicon interfaces," *Physical Review B* 90, 024301 (2014).
18. G. T. Hohensee, W.-P. Hsieh, M. D. Losego and D. G. Cahill, "Interpreting picosecond acoustics in the case of low interface stiffness," *Review of Scientific Instruments* 83, 114902 (2012).
19. D. G. Cahill, P. V. Braun, G. Chen, D. R. Clarke, S. Fan, K. E. Goodson, P. Keblinski, W. P. King, G. D. Mahan, A. Majumdar, H. J. Maris, S. R. Phillpot, E. Pop and L. Shi, "Nanoscale thermal transport. II. 2003-2012," *Applied Physics Reviews* 1, 011305 (2014).
20. D. G. Cahill, K. E. Goodson and A. Majumdar, "Thermometry and thermal transport in micro/nanoscale solid-state devices and structures," *Journal of Heat Transfer* 124, 223-241 (2002).
21. R. Rosei and D. W. Lynch, "Thermomodulation spectra of Al, Au, and Cu," *Physical Review B* 5, 3883-3894 (1972).
22. R. Rosei, "Temperature modulation of the optical transitions involving the Fermi surface in Ag: Theory," *Physical Review B* 10, 474-483 (1974).
23. R. Rosei, C. H. Culp and J. H. Weaver, "Temperature modulation of the optical transitions involving the Fermi surface in Ag: Experimental," *Physical Review B* 10, 484-489 (1974).
24. P. E. Hopkins, "Effects of electron-boundary scattering on changes in thermoreflectance in thin metal films undergoing intraband excitations," *Journal of Applied Physics* 105, 093517 (2009).
25. P. E. Hopkins, "Influence of electron-boundary scattering on thermoreflectance calculations after intra- and interband transitions induced by short-pulsed laser absorption," *Physical Review B* 81, 035413 (2010).
26. Y. Wang, J. Y. Park, Y. K. Koh and D. G. Cahill, "Thermoreflectance of metal transducers for time-domain thermoreflectance," *Journal of Applied Physics* 108, 043507 (2010).
27. R. B. Wilson, B. A. Apgar, L. W. Martin and D. G. Cahill, "Thermoreflectance of metal transducers for optical pump-probe studies of thermal properties," *Optics Express* 20, 28829-28838 (2012).
28. C. A. Paddock and G. L. Eesley, "Transient thermoreflectance from thin metal films," *Journal of Applied Physics* 60, 285-290 (1986).
29. D. G. Cahill, "Analysis of heat flow in layered structures for time-domain thermoreflectance," *Review of Scientific Instruments* 75, 5119-5122 (2004).
30. R. M. Costescu, M. A. Wall and D. G. Cahill, "Thermal conductance of epitaxial interfaces," *Physical Review B* 67, 054302 (2003).
31. A. J. Schmidt, "Pump-probe thermoreflectance," *Annual Review of Heat Transfer* 16, 159-181 (2013).
32. A. J. Schmidt, R. Cheaito and M. Chiesa, "A frequency-domain thermoreflectance method for the characterization of thermal properties," *Review of Scientific Instruments* 80, 094901 (2009).
33. J. Yang, E. Ziade, C. Maragliano, R. Crowder, X. Wang, M. Stefancich, M. Chiesa, A. K. Swan and A. J. Schmidt, "Thermal conductance imaging of graphene contacts," *Journal of Applied Physics* 116, 023515 (2014).
34. A. J. Schmidt, R. Cheaito and M. Chiesa, "Characterization of thin metals films via frequency-domain thermoreflectance," *Journal of Applied Physics* 107, 024908 (2010).
35. P. E. Hopkins, J. R. Serrano, L. M. Phinney, S. P. Kearney, T. W. Grasser and C. T. Harris, "Criteria for cross-plane dominated thermal transport in multilayer thin film systems during modulated laser heating," *Journal of Heat Transfer* 132, 081302 (2010).
36. J. Yang, E. Ziade and A. J. Schmidt, "Modeling optical absorption for thermoreflectance measurements," *Journal of Applied Physics* 119, 095107 (2016).
37. J. T. Gaskins, A. Bulusu, A. J. Giordano, J. C. Duda, S. Graham and P. E. Hopkins, "Thermal conductance across phosphonic acid molecules and interfaces: Ballistic versus diffusive vibrational transport in molecular monolayers," *Journal of Physical Chemistry C* 119, 20931-20939 (2015).
38. C. S. Gorham, J. T. Gaskins, G. N. Parsons, M. D. Losego and P. E. Hopkins, "Density dependence of the room temperature thermal conductivity of atomic layer deposition grown amorphous alumina ($Al_2O_3$)," *Applied Physics Letters* 104, 253107 (2014).
39. P. E. Hopkins, "Vacancy and interface effects on phonon thermal transport in oxide nanostructures," Electronic Materials and Applications (Orlando, Fla., 2016).

REFERENCES

The devices, systems, apparatus, materials, compositions, components, computer readable medium, computer processors, and methods (of manufacture and use) of various embodiments of the invention disclosed herein may utilize aspects disclosed in the following references, applications, publications and patents and which are hereby incorporated by reference herein in their entirety (and which are not admitted to be prior art with respect to the present invention by inclusion in this section):

A. Jonathan A. Malen, Kanhayalal Baheti, Tao Tong, Yang Zhao, Janice A. Hudgings, Arun Majumdar, "Optical Measurement of Thermal Conductivity Using Fiber Aligned Frequency Domain Thermoreflectance, 133 Journal of Heat Transfer (Jun. 13, 2011).
B. Aaron J. Schmidt, Ramez Cheaito, and Matteo Chiesa, A frequency-domain thermoreflectance method for the characterization of thermal properties, 80 Review of Scientific Instruments (2009).
C. Dongliang Zhao, Xin Qian, Xiaokun Gu, Saad Ayub Jajja, Ronggui Yang, "Measurement Techniques for Thermal Conductivity and Interfacial Thermal Conductance of Bulk and Thin Film Materials," available at https://arxiv.org/abs/1605.08469.
D. James Christofferson, Ali Shakouri, Thermal measurements of active semiconductor micro-structures acquired through the substrate using near IR thermoreflectance, 35 Microelectronics Journal 791-96 (2004).
E. U.S. Pat. No. 8,264,693 B2, Stoica, et al., "Method and System for Measuring at Least One Property Including a Magnetic Property of a Material Using Pulsed Laser Sources", Sep. 11, 2012.
F. U.S. Pat. No. 7,619,741 B2, Nicolaides, L., et al., "Modulated Reflectance Measurement System with Multiple Wavelengths", Nov. 17, 2009.
G. R. B. Wilson, Brent A. Apgar, Lane W. Martin, and David G. Cahill, Thermoreflectance of metal transducers for optical pump-probe studies of thermal properties, 20 Optics Express (2010).
H. Fabian D. J. Brunner, Arno Schneider, and Peter Gunter, A terahertz time-domain spectrometer for simultaneous transmission and reflection measurements at normal incidence, 17 Optics Express 20684-93 (2009).
I. Thomas M E, Joseph R I, Tropf W J, Infrared transmission properties of sapphire, spinel, yttria, and ALON as a function of temperature and frequency, 27 Applied Optics 239-45 (1988).
J. B. Vermeersch, J. Christofferson, K. Maize, Time and frequency domain CCD-based thermoreflectance techniques for high-resolution transient thermal imaging, 26th Annual IEEE Semiconductor Thermal Measurement and Management Symposium (SEMI-THERM) (2010).
K. Ruoho, M., Valset, K., Finstad, T. & Tittonen, I. Measurement of thin film thermal conductivity using the laser flash method. Nanotechnology 26, 195706 (2015).
L. Campbell, R. C., Smith, S. E. & Dietz, R. L. Measurements of adhesive bondline effective thermal conductivity and thermal resistance using the laser flash method, in Fifteenth Annual IEEE Semiconductor Thermal Measurement and Management Symposium, 1999 83-97 (1999).
M. Wang L, Cheaito R, Braun J L, Giri A, Hopkins P E, Thermal conductivity measurements of non-metals via combined time- and frequency-domain thermoreflectance without a metal film transducer, Rev Sci Instrum (2016).
N. Jie Zhu, Dawei Tang, Wei Wang, Jun Liu, Kristopher W. Holub, Ronggui Yang, Ultrafast thermoreflectance techniques for measuring thermal conductivity and interface thermal conductance of thin films, 18 Journal of Applied Physics (2010).
O. C. Thomsen, J. Strait, Z. Vardeny, H. J. Maris, J. Tauc and J. J. Hauser, "Coherent phonon generation and detection by picosecond light pulses," Physical Review Letters 53, 989-992 (1984).
P. C. Thomsen, H. T. Grahn, H. J. *Maris* and J. Tauc, "Surface generation and detection of phonons by picosecond light pulses," Physical Review B 34, 4129-4138 (1986).
Q. Jie Zhu, Dawei Tang, Wei Wang, Jun Liu, Ronggui Yang, Frequency-Domain Thermoreflectance Technique for Measuring Thermal Conductivity and Interface Thermal Conductance of Thin Films, 14th International Heat Transfer Conference, Volume 6 (2010).
R. Yarai, A., et al., "Laptop photothermal reflectance measurement instrument assembled with optical fiber components", Review of Scientific Instruments 78, 054903-1-5, (2007).

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A method for measuring at least one property of a target material using thermoreflectance, the method comprising:
    generating a pump light beam at a pump wavelength with a pump device;
    generating a modulated pump beam by modulating an amplitude of an intensity of the pump light beam by sweeping between at least a first modulation frequency and a different second modulation frequency;
    directing at least a portion of the modulated pump beam to a manipulation portion of the target material;
    generating a probe beam at a probe wavelength with a probe device;
    directing at least a portion of the probe beam to a probing portion of the target material, wherein at least a part of the portion of the probe beam is reflected off of the target material forming a reflected probe beam, wherein the reflected probe beam has a similar modulated frequency characteristic as the pump beam;
    directing at least a portion of the reflected probe beam to a detection device, wherein the detection devices generates a detection signal from the reflected probe beam; and
    analyzing the detection signal with an analyzing device by receiving the detection signal with the analyzing device, and calculating the property of the target material by comparing the modulated frequency characteristics of the reflected probe beam to the modulated frequency characteristics of the pump beam; and
    wherein at least one of the pump wavelength and the probe wavelength is an infrared wavelength.

2. The method of claim 1, wherein the property of the target material is a thickness of the target material.

3. The method of claim 1, wherein the pump device comprises a pump fiber laser.

4. The method of claim 3, wherein the pump fiber laser comprises a fiber coupled laser or an in-fiber laser.

5. The method of claim 3, wherein the pump fiber laser is a single mode fiber laser or a multimode fiber laser.

6. The method of claim 1, wherein the probe device is a probe fiber laser.

7. The method of claim 6, wherein the probe fiber laser comprises a fiber coupled laser or an in-fiber laser.

8. The method of claim 6, wherein the probe fiber laser is a single mode fiber laser or a multimode fiber laser.

9. The method of claim 1, wherein generating a modulated pump light beam, directing at least a portion of the modulated pump light beam, and directing at least a portion of the probe light beam, further comprise utilizing fiber optic devices and not free-space optics.

10. The method of claim 9, wherein generating a modulated pump light beam further comprises directing at least a portion of the pump light beam to a modulation device using a fiber optic device and not free-space optics.

11. The method of claim 10, wherein the modulation device comprises an in-fiber modulation device.

12. The method of claim 1, wherein the target material comprises silicon on sapphire.

13. The method of claim 1, wherein the first modulation frequency and the second modulation frequency are in a range from about 10 Hz to about 100 GHz.

14. The method of claim 1, wherein the first modulation frequency and the second modulation frequency are in a range from about 1 GHz to about 100 GHz.

15. The method of claim 1, wherein modulating the amplitude the intensity of the pump beam further comprises modulating the amplitude of the intensity of the pump beam to produce a sinusoidal wave, a square wave, a triangle wave, or a sawtooth wave.

16. The method of claim 1, wherein of the pump wavelength is equal to the probe wavelength.

17. The method of claim 1, wherein the pump wavelength is different from the probe wavelength.

18. The method of claim 1, wherein the pump wavelength is at least partially absorptive in sapphire.

* * * * *